United States Patent
Raja

(10) Patent No.: US 10,191,853 B2
(45) Date of Patent: Jan. 29, 2019

(54) APPARATUS AND METHOD FOR MAINTAINING ADDRESS TRANSLATION DATA WITHIN AN ADDRESS TRANSLATION CACHE

(71) Applicant: ARM LIMITED, Cambridge (GB)

(72) Inventor: Abhishek Raja, Austin, TX (US)

(73) Assignee: ARM Limited, Cambridge (GB)

( * ) Notice: Subject to any disclaimer, the term of this patent is extended or adjusted under 35 U.S.C. 154(b) by 86 days.

(21) Appl. No.: 15/290,039

(22) Filed: Oct. 11, 2016

(65) Prior Publication Data
US 2018/0101480 A1    Apr. 12, 2018

(51) Int. Cl.
*G06F 12/1009*   (2016.01)
*G06F 12/1027*   (2016.01)

(52) U.S. Cl.
CPC ...... *G06F 12/1009* (2013.01); *G06F 12/1027* (2013.01)

(58) Field of Classification Search
CPC combination set(s) only.
See application file for complete search history.

(56) References Cited

U.S. PATENT DOCUMENTS 8,516,221 B2 *  8/2013  Thelen ............... G06F 12/1027
                                                  711/207
8,601,223 B1 *  12/2013  Yuan .................. G06F 12/1027
                                                  345/535
2010/0115229 A1  5/2010  Thelen

* cited by examiner

*Primary Examiner* — Eric Cardwell
(74) *Attorney, Agent, or Firm* — Nixon & Vanderhye P.C.

(57) ABSTRACT

An apparatus and method are provided for maintaining address translation data within an address translation cache. Each entry of the address translation cache is arranged to store address translation data used when converting a virtual address into a corresponding physical address of a memory system. Control circuitry is used to perform an allocation process to determine the address translation data to be stored in each entry. When performing the allocation process for a selected entry, the control circuitry is arranged to perform a page table walk process using a virtual address in order to obtain from a page table a plurality of descriptors including a descriptor identified using the virtual address. The control circuitry then determines whether predetermined criteria are met by the plurality of descriptors, the predetermined criteria comprising page alignment criteria and attribute match criteria. Each descriptor comprises physical address data and attribute data identifying a plurality of attributes, and the attribute match criteria allows the plurality of descriptors to have different values for a first subset of attributes when determining that the attribute match criteria is met. When the predetermined criteria are met, coalesced address translation data is generated from the plurality of descriptors and that coalesced address translation data is then stored in the selected entry. Otherwise, if the predetermined criteria is not met, address translation data is merely generated from the descriptor identified using the virtual address, and that address translation data is then stored in the selected entry. Such an approach significantly increases the effective capacity and performance of the address translation cache.

19 Claims, 18 Drawing Sheets

SETTING VALID AND DIRTY BITS IN COALESCED ENTRY

IF TWO STAGE ADDRESS TRANSLATION

APPARATUS AND METHOD FOR MAINTAINING ADDRESS TRANSLATION DATA WITHIN AN ADDRESS TRANSLATION CACHE

BACKGROUND

The present technique relates to an apparatus and method for maintaining address translation data within an address translation cache.

It is known to provide data processing systems which incorporate an address translation cache, such as a translation lookaside buffer (TLB), to store address translation data relating to the translation of, for example, virtual addresses to physical addresses. The address translation data can also provide attribute data regarding the memory accesses being made, such as permission data and memory attributes. Whilst the provision of an address translation cache is useful in improving performance by reducing the number of slow page table walks required, the address translation cache itself consumes circuit resources.

It is known to create coalesced TLB entries in the specific situation where multiple descriptors meet page alignment criteria and have the same attribute data. However, whilst creating coalesced entries can allow more efficient use of the address translation cache resources to be made, it is often the case that the existing requirements for coalescing are not present, and hence the opportunities to create coalesced entries are limited.

Accordingly, it is desirable to make more efficient use of the capacity of the address translation cache.

SUMMARY

At least some embodiments of the present disclosure provide an apparatus comprising: an address translation cache having at least one entry, each entry to store address translation data used when converting a virtual address into a corresponding physical address of a memory system; control circuitry to perform an allocation process to determine the address translation data to be stored in each entry; the control circuitry arranged when performing the allocation process for a selected entry in the address translation cache: to perform a page table walk process using a virtual address in order to obtain from a page table a plurality of descriptors including a descriptor identified using the virtual address; to determine whether predetermined criteria are met by said plurality of descriptors, said predetermined criteria comprising page alignment criteria and attribute match criteria, each descriptor comprising physical address data and attribute data identifying a plurality of attributes, and the attribute match criteria allowing the plurality of descriptors to have different values for a first subset of the attributes when determining that the attribute match criteria is met; when said predetermined criteria are met, to generate coalesced address translation data from said plurality of adjacent descriptors and to store said coalesced address translation data in said selected entry; and in absence of said predetermined criteria being met, to generate address translation data from the descriptor identified using the virtual address and to store that address translation data in said selected entry.

At least some embodiments of the present disclosure provide a method of maintaining address translation data within an address translation cache having at least one entry, each entry storing address translation data used when converting a virtual address into a corresponding physical address of a memory system, the method comprising, when performing an allocation process to determine the address translation data to be stored in a selected entry in the address translation cache: performing a page table walk process using a virtual address in order to obtain from a page table a plurality of descriptors including a descriptor identified using the virtual address; determining whether predetermined criteria are met by said plurality of descriptors, said predetermined criteria comprising page alignment criteria and attribute match criteria, each descriptor comprising physical address data and attribute data identifying a plurality of attributes, and the attribute match criteria allowing the plurality of descriptors to have different values for a first subset of the attributes when determining that the attribute match criteria is met; when said predetermined criteria are met, generating coalesced address translation data from said plurality of adjacent descriptors and storing said coalesced address translation data in said selected entry; and in absence of said predetermined criteria being met, generating address translation data from the descriptor identified using the virtual address and storing that address translation data in said selected entry.

At least some embodiments of the present disclosure provide an apparatus comprising: address translation cache means for having at least one entry, each entry for storing address translation data used when converting a virtual address into a corresponding physical address of a memory system; control means for performing an allocation process to determine the address translation data to be stored in each entry; the control means, when performing the allocation process for a selected entry in the address translation cache means: for performing a page table walk process using a virtual address in order to obtain from a page table a plurality of descriptors including a descriptor identified using the virtual address; for determining whether predetermined criteria are met by said plurality of descriptors, said predetermined criteria comprising page alignment criteria and attribute match criteria, each descriptor comprising physical address data and attribute data identifying a plurality of attributes, and the attribute match criteria allowing the plurality of descriptors to have different values for a first subset of the attributes when determining that the attribute match criteria is met; when said predetermined criteria are met, for generating coalesced address translation data from said plurality of adjacent descriptors and for storing said coalesced address translation data in said selected entry; and in absence of said predetermined criteria being met, for generating address translation data from the descriptor identified using the virtual address and for storing that address translation data in said selected entry.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
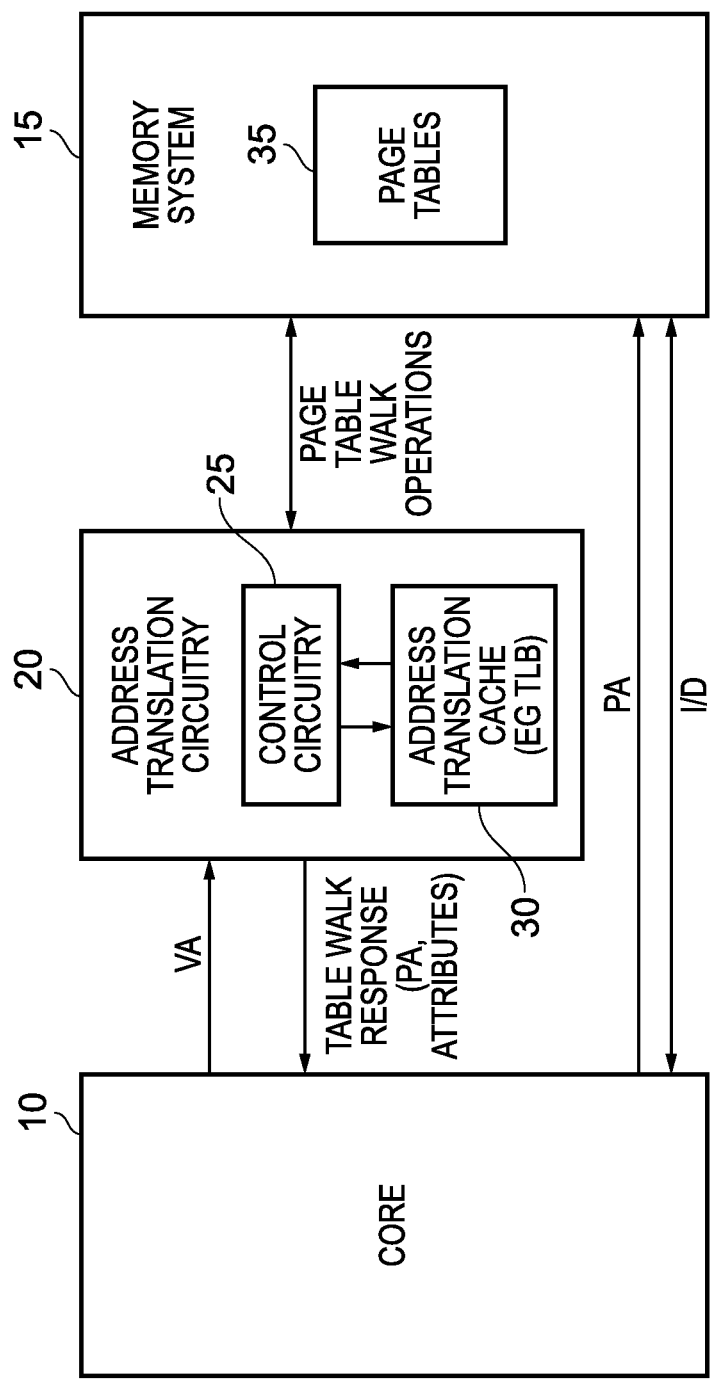
FIG. 1 illustrates a data processing system incorporating an address translation cache in accordance with one embodiment.

Before discussing the embodiments with reference to the accompanying figures, the following description of embodiments is provided.

In one embodiment an apparatus is provided that has an address translation cache having at least one entry, where each entry stores address translation data used when converting a virtual address into a corresponding physical address of a memory system. The apparatus also has control circuitry to perform an allocation process to determine the address translation data to be stored in each entry. When performing the allocation process for a selected entry in the address translation cache, the control circuitry is arranged to perform a page table walk process using a virtual address in order to obtain from a page table a plurality of descriptors that include a descriptor identified using the virtual address. The control circuitry is then arranged to determine whether predetermined criteria are met by the plurality of descriptors, the predetermined criteria comprising page alignment criteria and attribute match criteria. Each descriptor comprises physical address data and attribute data identifying a plurality of attributes, and the attribute match criteria allows the plurality of descriptors to have different values for a first subset of the attributes when determining that the attribute match criteria is met.

When the predetermined criteria are met, the control circuitry is then arranged to generate coalesced addressed translation data from the plurality of adjacent descriptors and to store that coalesced address translation data in the selected entry. Accordingly, by speculatively retrieving not only the descriptor identified using the virtual address, but a plurality of descriptors including that descriptor, and by enabling some variation in the values of certain attributes of those descriptors to be present whilst still determining that the attribute match criteria is met, the technique significantly increases occurrences where coalesced address translation data can be generated from those descriptors, thus significantly increasing the effective capacity and performance of the address translation cache. In particular, each time coalesced address translation data is generated, a single entry can be used to maintain that coalesced address translation data, thereby avoiding the need to utilise multiple entries to capture such address translation data.

In the absence of the predetermined criteria being met, the control circuitry merely generates address translation data from the descriptor identified using the virtual address and stores that address translation data in the selected entry.

In such an embodiment, the control circuitry can be arranged to determine that the attribute match criteria is met when all attributes identified by the attribute data of the plurality of descriptors match other than a first subset of the attributes. By allowing the first subset of attributes to differ, this can increase the number of instances in which it can be determined that coalesced address translation data can be generated. In one embodiment, as will be discussed in more detail below, a mechanism can be provided in association with each entry to effectively take account of the fact that the first subset of attributes may not match.

Whilst the plurality of descriptors obtained from the page table may in principle be intermediate level descriptors identified during a multi-level page table walk process, in one embodiment the control circuitry is arranged to make generation of the coalesced address translation data dependent on the plurality of descriptors being final level descriptors identified during a multi-level page table walk process. Such final level descriptors provide sufficient information in combination with the other descriptors obtained during the multi-level page table walk process to provide a full translation from the virtual address to a physical address.

In one embodiment, there may be more than one type of final level descriptor provided. For example, the final level descriptors may be page descriptors or block descriptors as discussed in the ARM Architecture Reference Manual, page descriptors being obtained at a final provided level of the page table walk process, whilst block descriptors can be reached before the final level of a page table walk process. In one particular embodiment, the control circuitry is arranged to make generation of the coalesced address translation data dependent on the plurality of descriptors being page descriptors identified during the multi-level page table walk process.

Each descriptor in the plurality of descriptors may be associated with a physical page in the memory system. In one embodiment, the first subset of attributes that is allowed to differ whilst still enabling the attribute match criteria to be met comprises at least one of an access flag identifying whether the associated physical page has been accessed, and a dirty flag identifying whether the associated physical page contains dirty data. Whilst the first subset may include one or other of the access flag and the dirty flag, in one embodiment the first subset includes both the access flag and the dirty flag, allowing values of both of those flags to differ between the plurality of descriptors.

In one embodiment, when performing the page table walk process, the control circuitry is arranged to cause the access flag to be set within the descriptor identified using the virtual address. However, it should be noted that in such embodiments the access flag is not set in association with any of the other of the plurality of descriptors that are obtained in addition to the descriptor identified using the virtual address.

Similarly, when performing the page table walk process, the control circuitry may be arranged to cause the dirty flag to be set within the descriptor identified using the virtual address in situations when the virtual address is associated with a store operation used to update data within the associated physical page. When performing a page table walk process for a store operation, it is known that the identified physical page will be updated, and accordingly the dirty flag can be set within the descriptor. Again, no update is made to the dirty flag maintained by any of the other of the plurality of descriptors obtained in addition to the descriptor identified using the virtual address.

In one embodiment, in order to accommodate the fact that values of the first subset of attributes are allowed to differ amongst the plurality of descriptors whilst still allowing coalesced address translation data to be generated, the control circuitry is arranged to generate the coalesced address translation data to contain, for each of the descriptors, control data derived from the first subset of the attributes. The control data can hence identify descriptor specific attribute information that can later be referenced during lookup operations.

In one embodiment, the control data comprises a valid flag for each descriptor, which is set in dependence on the access flag of the associated descriptor. Hence, the sequence of valid flags provided within the control data identify, for each descriptor, whether that descriptor has been accessed. This can be used to control hit and miss detection when subsequently performing lookups in respect of entries containing coalesced address translation data, such that a hit will only be detected if the valid flag for the relevant descriptor is set, indicating that the associated page has been accessed.

In one embodiment, the control data also comprises a dirty flag for each descriptor, which is set in dependence on the dirty flag of the associated descriptor. Hence the dirty information in respect of each of the descriptors can be captured within the coalesced entry.

In one embodiment, the multi-level page table walk process involves, at each level, a single stage. However, in an alternative embodiment multiple stages of translation may be involved at each level. For example, a first stage of translation may correspond to address translation managed by a guest operating system, whilst a second stage of translation may correspond to address translation managed by a hypervisor. In such embodiments, the control data that is generated in respect of a coalesced data entry takes account of the first subset of the attributes of the descriptors identified by the multiple stages.

In one embodiment the plurality of descriptors obtained from the page table during the page table walk process comprise N adjacent descriptors. By retrieving a plurality of adjacent descriptors, this means that the virtual page numbers identifying these descriptors relate to contiguous pages, and the choice of the plurality can be arranged to ensure that those pages are aligned to a larger page size. Hence, by way of example, by selecting a plurality of adjacent descriptors, a series of contiguous virtual pages may be identified that are aligned to a larger page size than the individual virtual pages.

The page alignment criteria can then be referenced in order to determine whether the physical pages assigned to those contiguous virtual pages (as identified by the descriptors) are also contiguous. If so, then having determined that the descriptors identify contiguous physical pages that have been assigned to contiguous virtual pages, and assuming the earlier-mentioned attribute match criteria are met, this makes it possible to create coalesced address translation data from the plurality of adjacent descriptors that can then be used when translating virtual addresses to physical addresses within that sequence of contiguous pages.

In one embodiment, each descriptor in the plurality of descriptors is associated with a physical page in said memory system, and said page alignment criteria requires the physical pages associated with said plurality of descriptors to be N-page aligned. Hence, purely by way of example, if four descriptors are retrieved for consideration, the page alignment criteria can be applied to determine whether the plurality of descriptors are quad-page aligned.

The assessment of the page alignment criteria could be determined in a variety of ways, but in one embodiment each descriptor comprises physical address data, and the control circuitry is arranged to determine that the page alignment criteria has been met when log N least significant bits of physical page number bits of the physical address data are different for each descriptor in said plurality and follow a predetermined sequence, and the remaining bits of the physical page number bits of the physical address data are the same for each descriptor in said plurality. The physical page number bits of the physical address data can be determined with regard to the page size of the page associated with the descriptor.

Hence, purely by way of example, if four descriptors are retrieved, the two least significant bits of the physical page number bits of each descriptor will be reviewed, and it may in one embodiment be determined that the page alignment criteria has been met if those least significant two bits of each descriptor follow the sequence "00", "01", "10" and "11".

In an alternative embodiment, there may be more than one bit sequence that is considered to meet the page alignment criteria (provided the remaining bits of the physical page number bits are the same for each descriptor in said plurality), and hence each of those possible bit sequences could be checked for. For example, whilst the sequence discussed above would cover the case when increasing virtual page numbers are mapped to increasing physical page numbers, it is also possible that physical pages could be mapped in the reverse order, and in this case the bit sequence may be "11", "10", "01" and "00". In situations where the page alignment criteria can be determined to be met for any one of multiple different bit sequences, and hence the presence of any one of those bit sequences allows the coalesced entry to be created, when the coalesced entry is created a field can be populated to identify which bit sequence caused the coalesced entry to be created. This field can then later be referred to when a match is detected with regard to the coalesced entry during a lookup operation, in order to determine how to compute the physical page number bits from the address translation data in the coalesced entry. For instance, considering the above example where four descriptors are coalesced, and accordingly it is the two least significant bits that are considered when looking for a bit sequence that matches the page alignment criteria, information in this field can be used to determine the two least significant bits of the physical page number bits.

There are a number of ways in which the control circuitry can keep track of which entries are storing coalesced address translation data and which entries are not. In one embodiment, each entry has an identifier field whose value is controlled by the control circuitry to identify when the address translation data stored therein is coalesced address translation data.

In one embodiment, the control circuitry is arranged to perform a lookup process in response to a received virtual address to determine with reference to virtual address data maintained in the entries of the address translation table, whether a hit condition is detected. When the address translation cache is arranged as a fully associative structure, each of the entries may be considered when determining whether a hit condition is present. However, when the address translation cache has a set associative structure, certain bits of the received virtual address will be used to identify a particular set, with the entries in that set being considered in order to determine whether a hit condition is detected.

During the lookup process, the control circuitry is arranged, when analysing an entry containing said coalesced address translation data, to use log N least significant bits of virtual page number bits of the received virtual address to identify associated control data within the entry, where N is the number of descriptors in said plurality of descriptors. It then detects presence of a hit if at least the valid flag within the associated control data is set and the remaining bits of the virtual page number bits match corresponding bits within the virtual address data of the entry. Hence, when considering a coalesced entry, the effective page size is increased, since not all of the virtual page number bits need to match corresponding bits within the virtual address data. Instead, the log N least significant bits of the virtual page number bits are used to identify the control data, whilst the remaining bits are compared against the corresponding bits within the virtual address data of the entry. For a hit to be detected, not only will the compared address bits need to match, but also at least the valid flag provided within the identified control data will need to be set, to identify that the associated page has been accessed.

In one embodiment, if the compared address bits match, but the relevant valid bit is not set, this will be interpreted as a miss, causing the page table walk process to be re-performed to set the access flag in the relevant descriptor, which will result in the plurality of descriptors again being obtained. Assuming it is determined that the predetermined criteria is still met, then the coalesced address translation data will again be generated, this time having the relevant valid bit set, and that data will be used to overwrite the existing coalesced entry.

When considering store operations, then not only the valid flag, but also the dirty flag for the relevant control data, will be considered before it is determined if a hit is detected or not. In particular, the control circuitry will detect the presence of a hit if both the valid flag and the dirty flag within the associated control data are set, and the remaining bits of the virtual page number bits match corresponding bits within the virtual address data of the entry. Otherwise, a miss will be detected, to invoke the page table walk process, which will ensure in due course that the dirty flag within the relevant descriptor gets set when that descriptor is accessed during the page table walk process. Again this process may result in the coalesced address translation data being recreated, and then used to overwrite the existing coalesced entry contents.

In one embodiment, if the control circuitry performs the lookup process to implement an entry invalidation request, the control circuitry is responsive to detecting the hit condition in relation to an entry containing said coalesced address translation data, to clear the valid flag of the associated control data identified using said log N least significant bits of virtual page number bits of the received virtual address, whilst leaving the remaining valid flags within the control data unchanged.

In this embodiment, it is hence not necessary to invalidate the entire coalesced entry, but instead merely the valid flag for the relevant portion of the coalesced entry can be invalidated. As a result, if an access to the associated page is subsequently sought, then this will be detected as a miss within the coalesced entry of the address translation cache, causing the page table walk process to be performed.

Particular embodiments will now be described with reference to the Figures.

FIG. 1 schematically illustrates a data processing system including a processor core 10 for executing program instructions and for performing data accesses (both instruction fetches and accesses to data to be manipulated) using virtual addresses VA. These virtual addresses are subject to address translation to physical addresses PA by address translation circuitry 20. The physical addresses are used to control access to instructions and data in a memory system 15. The memory system 15 may comprise a memory hierarchy, such as multiple levels of cache memory and a main memory or other non-volatile storage.

As shown in FIG. 1, the address translation circuitry 20 includes an address translation cache 30, which in one example may take the form of a translation lookaside buffer (TLB). The address translation cache 30 has a plurality of entries, where each entry stores address translation data used when converting a virtual address into a corresponding physical address of a memory system. The address translation data is determined by performing page table walk operations in respect of page tables 35 stored within the memory system 15. As will be discussed later with reference to FIG. 3, a multi-level page table walk process may be used in order to obtain, with reference to a final level descriptor, full address translation data enabling a virtual address to be converted into a physical address, and that full address translation data may be stored within the address translation cache 30. Taking the example where the address translation cache is a TLB, a TLB is usually used to store such full address translation data. In one embodiment, the techniques described herein to generate coalesced address translation data are performed in respect of full address translation data obtained with reference to such final level descriptors.

As shown schematically in FIG. 1, when the core 10 issues a virtual address to the address translation circuitry 20, the control circuitry can perform a lookup operation within the address translation cache 30 to determine whether a hit is detected within one of the entries of the address translation cache. If the address translation cache is arranged in a fully associative manner, all of the entries may be considered during the lookup operation. However, if the address translation cache has a set associative structure, then certain bits of the virtual address will be used as an index into the address translation cache in order to identify a set, and the entries within that set will be reviewed in order to determine whether a hit is detected. If a hit is detected, then a table walk response can be returned directly to the processor core 10, this including physical address bits and associated attributes stored within the hit entry within the address translation cache. Based on this information, the core can then generate a physical address to output to the memory system 15 in order to access a required instruction, or data to be manipulated. If a hit is not detected within the address translation cache, the address translation circuitry 20 will initiate a page table walk process in order to access the relevant page tables 35 within the memory system in order to walk through a sequence of descriptors until a final level descriptor is obtained, at which point full address translation data can be determined and an appropriate table walk response can then be returned to the core. During this process, one or more entries within the address translation cache 30 can be allocated to store address translation data derived from the accessed descriptors. This is likely to enable a subsequently issued virtual address to result in a hit within the address translation cache, thereby reducing access times.

Figure 2:
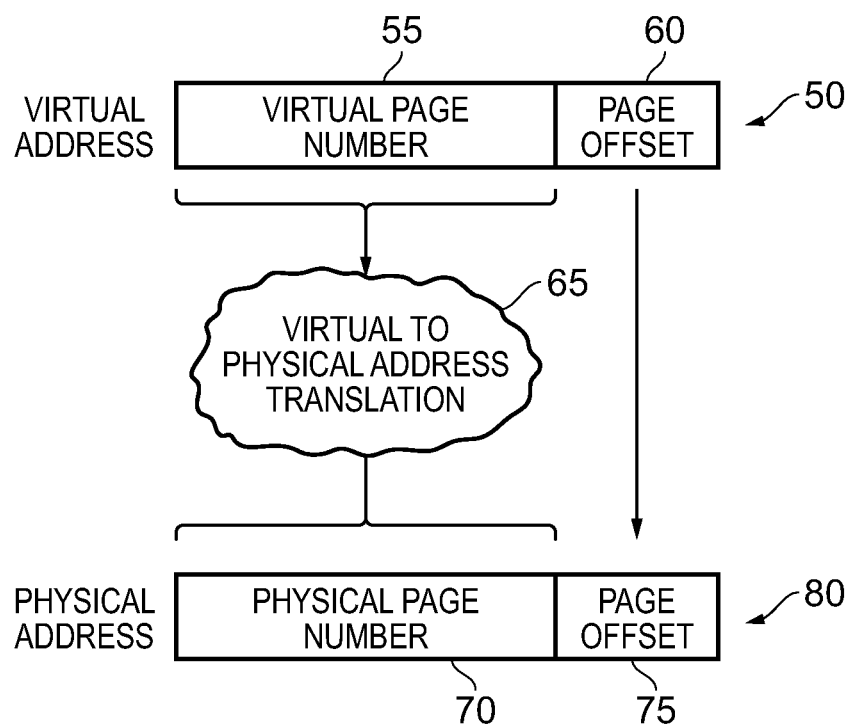
FIG. 2 is a diagram schematically illustrating a virtual to physical address translation process.

FIG. 2 is a diagram schematically illustrating the address translation process. A virtual address 50 can be considered to comprise a number of bits 55 identifying a virtual page number, and some other bits 60 identifying a page offset. The number of bits forming the virtual page number and the number of bits forming the page offset will depend on the page size. The address translation operation performed by the address translation circuitry 20 is illustrated schematically by the element 65 shown in FIG. 2, and serves to obtain address translation information sufficient to enable the virtual page number bits 55 to be translated into equivalent bits 70 of a physical address 80 identifying a physical page number. The page offset bits are not altered, and accordingly the page offset bits 75 are directly determined from the page offset bit 60 in the virtual address.

Figure 3:
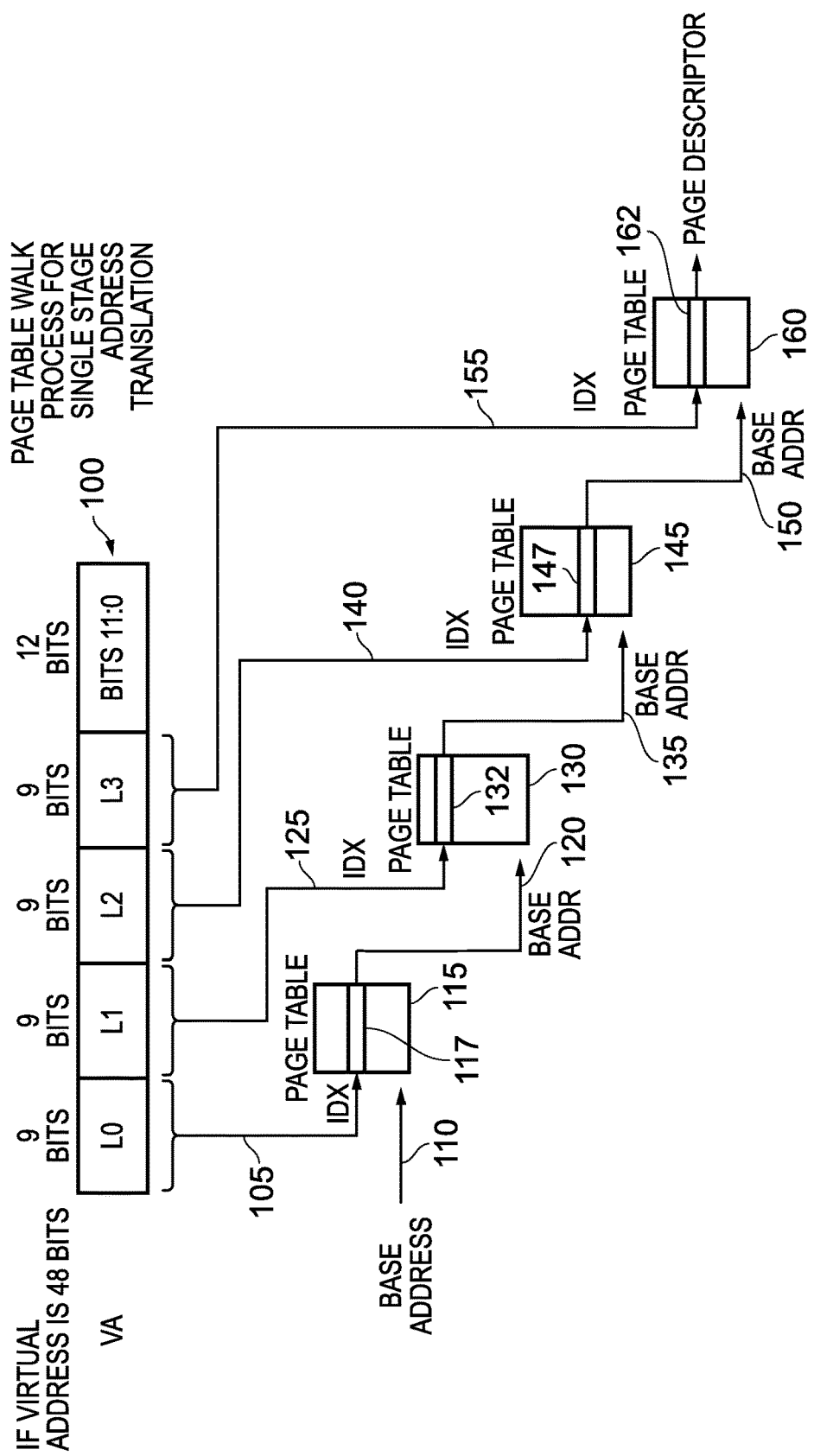
FIG. 3 schematically illustrates a multi-level page table walk which includes a single stage address translation process.

FIG. 3 is a diagram schematically illustrating the page table walk operation assuming there is a single stage address translation mechanism being used. In this example, it is assumed that the virtual address is 48 bits, and hence the virtual address 100 has a series of 9 bit portions associated with different levels of the page table walk process, with the 12 least significant bits denoting page offset.

At the start of the page table walk process, a base register is accessed to identify a base address 110 that is used to identify the page table 115. The 9 bits 105 associated with level zero of the page table walk process are used to identify an index into that page table 115, and hence identify an intermediate level descriptor 117. This intermediate level descriptor 117 provides a base address 120 that is used to identify a further page table 130, with the level one virtual address bits 125 being used to identify an index into that table. This identifies the intermediate level descriptor 132 that provides a further base address 135 to identify the page table 145. The level 2 virtual address bits 140 are then used to provide an index into that table 145 in order to identify the intermediate level descriptor 147, which then provides the base address 150 that identifies a final page table 160. The level 3 virtual address bits 155 then provide an index into that table 160, identifying a final level descriptor 162 also referred to as a page descriptor. With the information provided by the page descriptor, it is then possible to generate address translation data for storing in one of the entries of the TLB 30 enabling the virtual page number 55 to be converted into a physical page number 70 and hence allowing the required page in memory to be identified. This then enables the particular item of data (or instruction) corresponding to the virtual address to be accessed by the core 10 issuing the required physical address to the memory system 15.

It should be noted that in some embodiments final level descriptors can be specified at an earlier level in the page table walk process. For example, the descriptor 147 can have a block field which, when set, indicates that that descriptor is a block descriptor, which is a type of final level descriptor, rather than being an intermediate level descriptor. Hence, the information within the descriptor 147 can be used to produce the full address translation data.

Figure 4A:
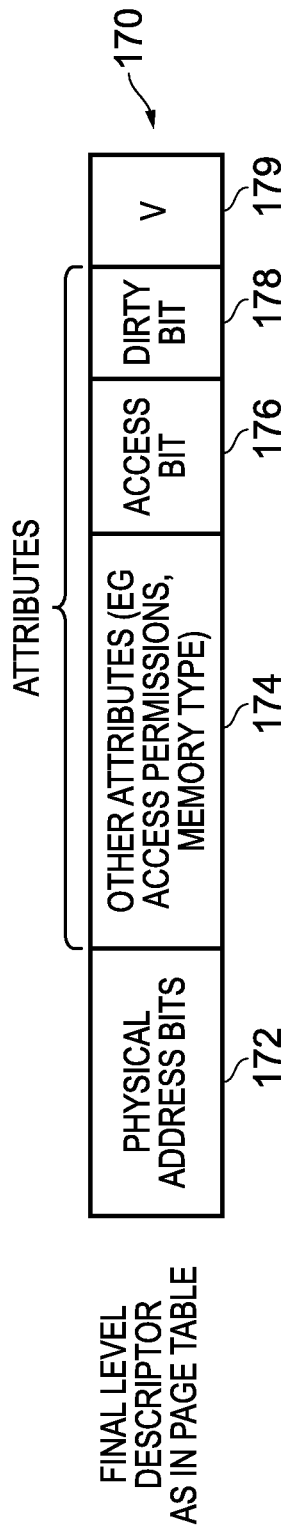
FIG. 4A illustrates fields provided within a final level descriptor stored in a page table in accordance with one embodiment.

FIG. 4A schematically illustrates fields that may be provided within a final level descriptor of a page table. In particular, the final level descriptor 170 includes the field 172 providing physical address bits, and one or more fields providing a number of attributes. The attributes can take a variety of forms, and as shown by the block 174 may include access permissions, and memory type information, such as whether the associated page relates to a writeback region of memory, non-cacheable region, etc. In addition, an access bit 176 can be provided to identify whether the associated physical page in memory has been accessed, and a dirty bit 178 can be provided to identify whether the associated physical page contains dirty data, i.e. data that is more up to date than the copy held in main memory. In addition, a valid bit 179 can be provided to identify whether the descriptor is valid or not. If an invalid descriptor is encountered during a page table walk process, then this will typically result in a page fault being raised.

It should be noted that intermediate level descriptors will also store physical address bits and associated attributes, as well as having a valid bit, but will not have access bits or dirty bits, since the physical pages that such intermediate level descriptors point to are themselves pages containing descriptors rather than pages containing the final data and/or instructions to be accessed. In accordance with the embodiments to be described herein with reference to the remaining figures, the control circuitry 25 is arranged under certain conditions to identify that coalesced address translation data can be generated for a sequence of final level descriptors. In particular it is observed that many operating system memory allocation mechanisms naturally assign contiguous physical pages to contiguous virtual pages. The described embodiments enable such situations to be detected. On detecting such situations, and provided predetermined attribute match criteria is met, this causes coalesced address translation data to be generated that can be stored within a single entry, hence making more effective use of the available space within the address translation cache. In particular, when the page table walk process is performed, and the final level descriptor within the final page table is identified, not only that descriptor is retrieved, but instead a plurality of adjacent descriptors that include that descriptor are retrieved. The plurality of adjacent descriptors are chosen to be descriptors that are associated with contiguous virtual pages, where the corresponding virtual pages associated with the descriptors are aligned to a larger page size. These descriptors are hence associated with candidate contiguous virtual pages that may have corresponding contiguous physical pages assigned to them. The control circuitry is then arranged to apply predetermined criteria in order to determine whether the corresponding physical pages are indeed contiguous physical pages, and under that situation is arranged to generate coalesced address translation data to represent an effective larger physical page formed by those contiguous physical pages, provided predetermined attribute match criteria is met.

As mentioned above, in order to generate a coalesced entry, it is also necessary for the attribute match criteria to be met. However, the attribute match criteria allows the plurality of descriptors to have different values for a first subset of the attributes. In particular, in accordance with the embodiments to be described herein, the access and dirty bits are allowed to differ, hence increasing the number of situations where it can be determined that a coalesced entry can be created. As will be described in more detail later, these different access and dirty bits are represented by descriptor specific valid and dirty bits provided within the entries of the address translation cache.

For the purposes of the described embodiments, a radix tree page structure is assumed to be used, and hierarchical attributes, if any, will naturally be shared by the plurality of descriptors.

Figure 4B:
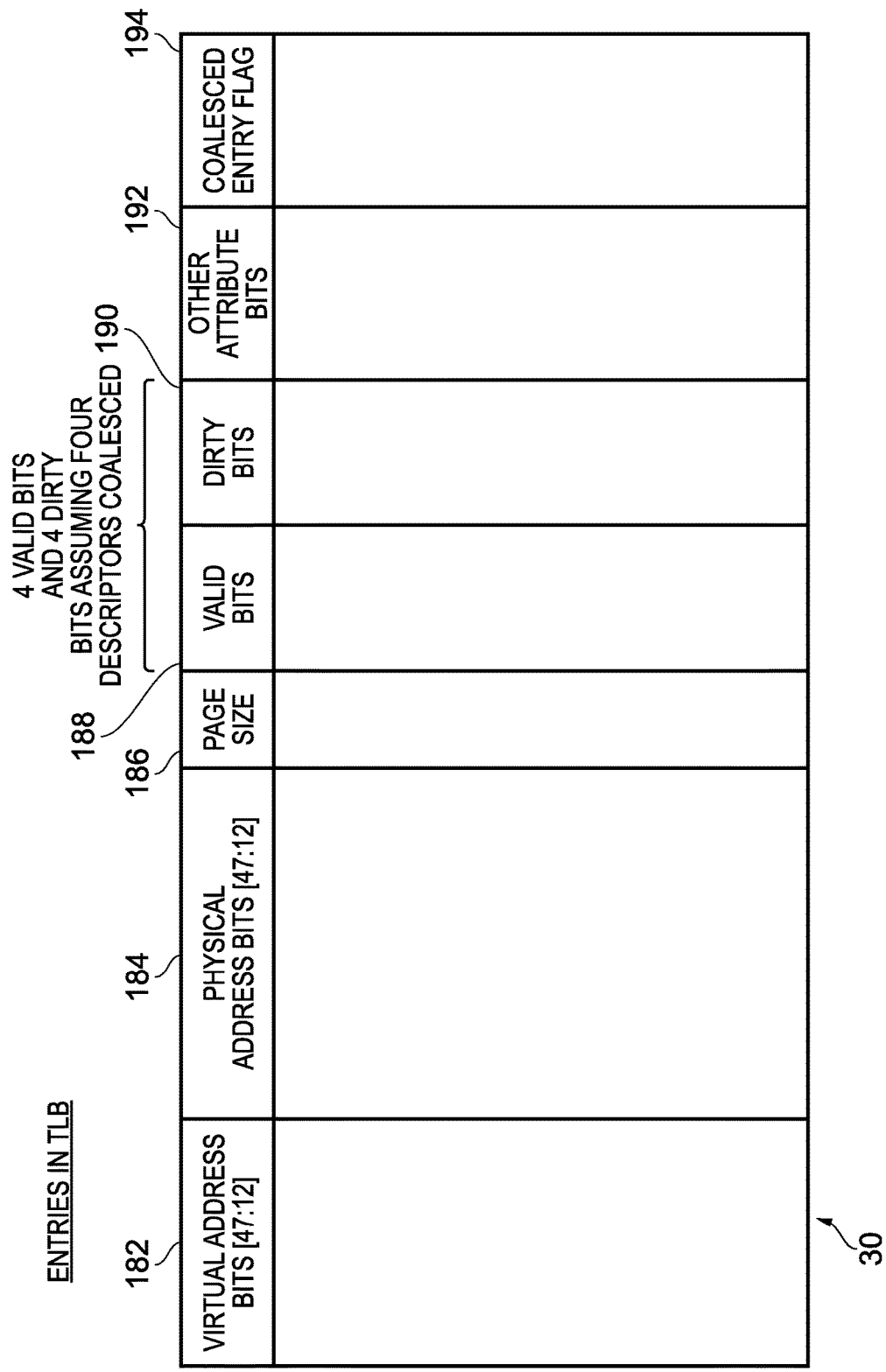
FIG. 4B is a diagram schematically illustrating fields provided within each entry of the address translation cache in accordance with one embodiment.

FIG. 4B schematically illustrates the fields provided within each entry of the address translation cache 30 in accordance with one embodiment. A field 182 contains a sequence of virtual address bits. Considering the earlier example of FIG. 3 using a 48-bit virtual address, bits 47 to 12 of the virtual address may be stored within field 182. Field 184 then stores the corresponding physical address bits for those virtual address bits. A page size field 186 is then provided to identify the size of the physical page referenced by the entry, in this example the smallest page size being 4 KB (4 Kbytes).

The attribute bits other than the access and dirty bits that are common amongst all of the descriptors being coalesced are stored within the other attributes field 192, and then a coalesced entry flag 194 is provided which is set when the corresponding entry stores coalesced address translation data.

As also shown in FIG. 4B, a series of valid bits 188 and a series of dirty bits 190 are also provided, with a separate valid bit and a separate dirty bit being provided for each of the descriptors that is used when generating the coalesced entry. Hence, by way of example, if during the page table walk process the control circuitry retrieves 4 adjacent descriptors, there will be 4 valid bits and 4 dirty bits.

As will be discussed in more detail later, the individual dirty bits within the dirty bit field 190 take their values from the dirty bits provided from the corresponding descriptors, whilst the individual valid bits have their values determined by the value of the access bits associated with those descriptors. Since when generating a coalesced entry it will not necessarily be the case that all of the physical pages associated with that coalesced entry will have been accessed, that access flag information can be used to form valid bits within the coalesced entry, where for a hit to be detected within a coalesced entry for a particular provided virtual address, it will be necessary for the relevant valid bit to be set. If the valid bit is not set, then the page table walk process will be performed, as a result of which the relevant final level descriptor will have its access bit set, and when the coalesced entry is recreated (and then used to replace the original entry in the TLB), that will cause the corresponding valid bit within the field 188 to also be set.

Figure 5:
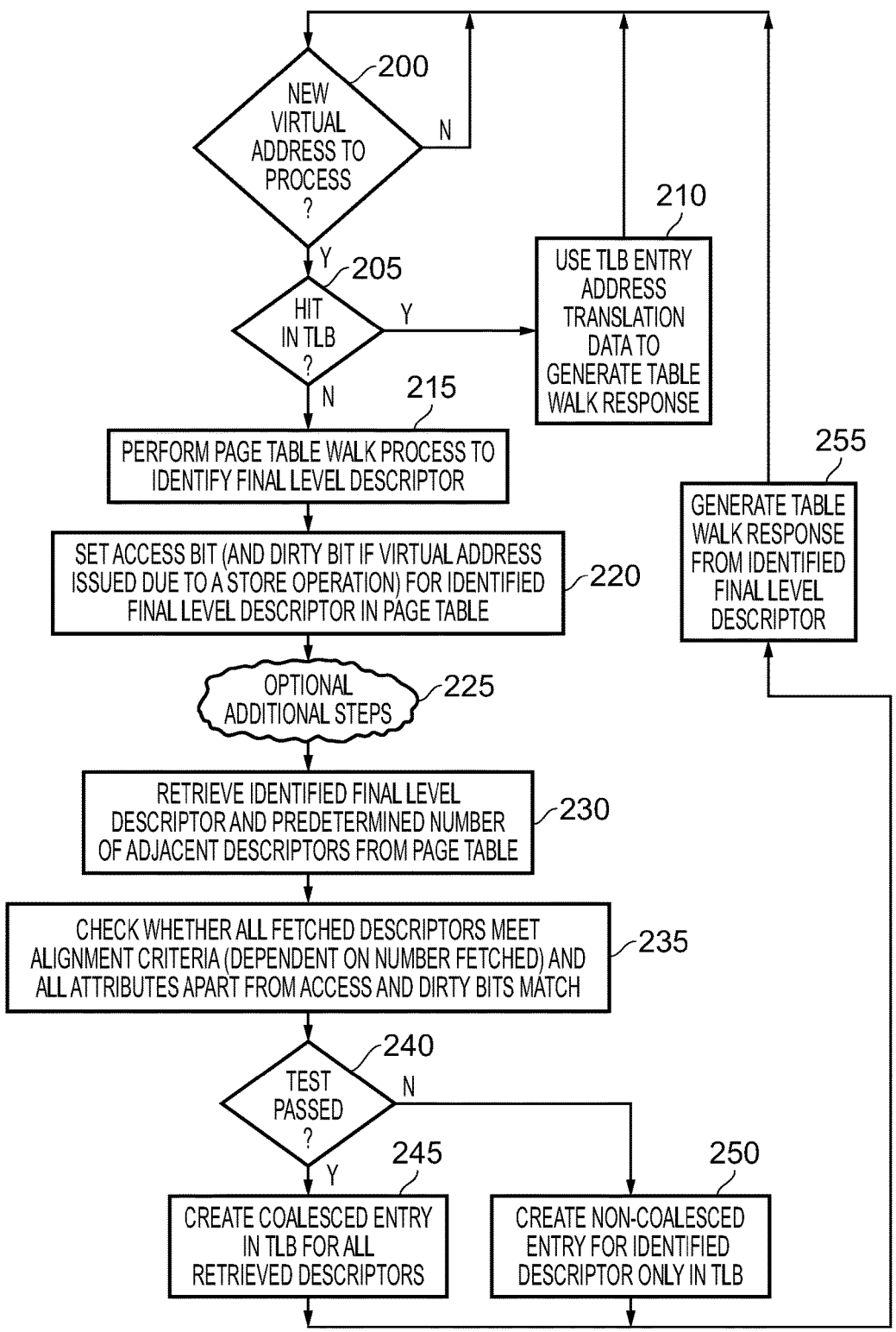
FIG. 5 is a flow diagram of the process performed by the control circuitry in FIG. 1 in order to allocate entries in the address translation cache in accordance with one embodiment.

FIG. 5 is a flow diagram illustrating steps performed by the control circuitry 25 upon receipt of a virtual address from the core 10, in accordance with one embodiment. At step 200, receipt of a virtual address from the core 10 is awaited, and once the virtual address has been received, a lookup operation is performed within the TLB 30 to determine whether a hit is detected with respect to any of the entries of the TLB. If a hit is detected, the process proceeds to step 210 where the address translation data within the hit entry of the TLB is used to generate the table walk response returned to the core 10.

However, in the absence of a hit in the TLB being detected at step 205, the process proceeds to step 215 where a page table walk process is performed by the control circuitry 25 in order to identify a final level descriptor. For a multi-level, single stage, page table walk process, the process discussed earlier with reference to FIG. 3 may be performed. For a multi-level, two-stage, page table wall process, the process discussed later with reference to FIG. 11 may be performed.

Once the final level descriptor has been identified, the access bit within that final level descriptor is set at step 220 in order to identify that the corresponding physical page is being accessed. In particular, once the page table walk response is provided back to the core, the core will access that page by issuing a physical address which falls within that page in memory in order to access data (or an instruction) contained therein. In the event that the access operation that is associated with the virtual address issued from the core is a store operation, and accordingly will be writing data to the associated physical page, the dirty bit within the identified final level descriptor will also be set at step 220.

In the embodiment illustrated in FIG. 5, it is assumed that coalesced address translation data is only formed in association with final level descriptors, but in principle such coalesced address translation data could also be formed in respect of intermediate level descriptors (with certain chosen attributes being allowed to differ), in which event the coalesced address translation data will be partial address translation data rather than full translation data. Furthermore, in the example of FIG. 5 it is assumed that any final level descriptor is a candidate for forming coalesced address translation data. However, as will be discussed later, with reference to FIG. 9, in an alternative embodiment only certain types of final level descriptor may be candidates for creating coalesced addressed translation data, and this is schematically illustrated in FIG. 5 by the optional additional steps 225.

Figure 9:
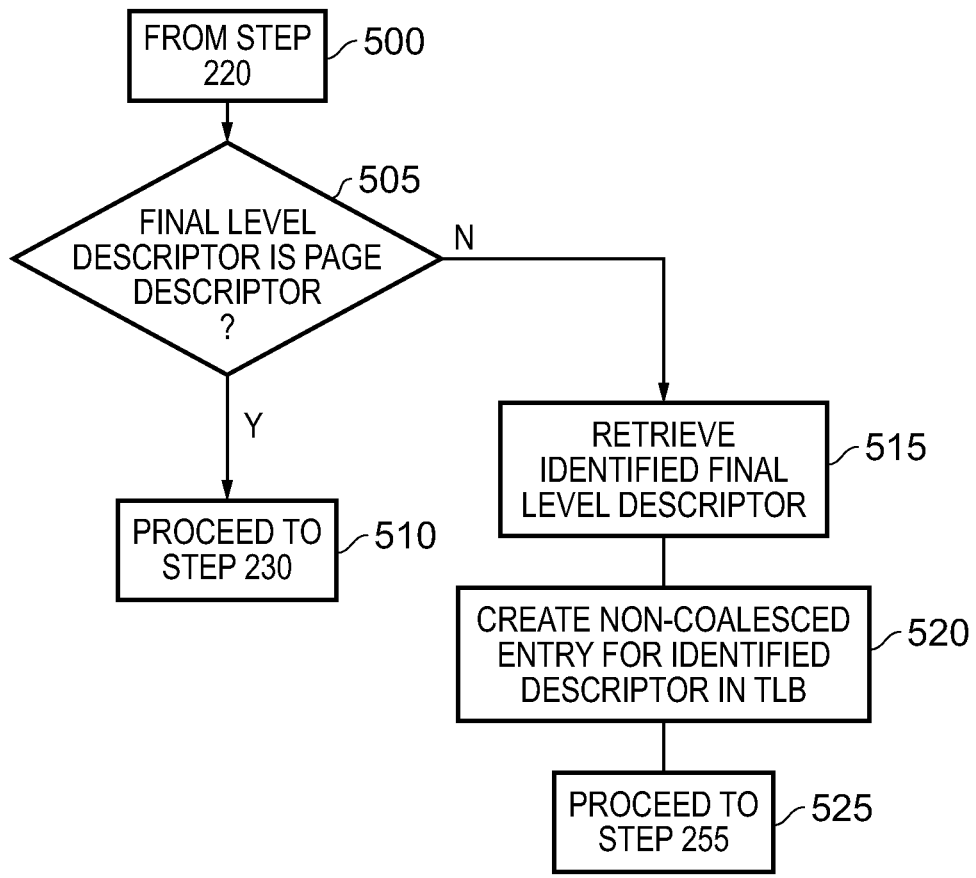
FIG. 9 is a flow diagram illustrating some optional steps that may be performed at step 225 of FIG. 5 in accordance with one embodiment.

Following step 220, or step 225 if the optional features of FIG. 9 are employed, the process proceeds to step 230 where the control circuitry 25 retrieves not only the identified final level descriptor, but also a predetermined number of adjacent descriptors from the page table. The plurality of descriptors retrieved at this stage relate to a contiguous sequence of virtual pages that are aligned to a larger page size.

The process then proceeds to step 235 where it is checked whether all of the fetched descriptors meet predetermined alignment criteria, the alignment criteria being dependent on the number of descriptors fetched. In particular, in one embodiment where N descriptors are fetched, then the alignment criteria that is checked at step 235 will be determined to be met when the log N least significant bits of physical page number bits within the physical address data provided in each descriptor are different to the corresponding bits in each of the other descriptors and follow a predetermined sequence, whilst in addition the remaining bits of the physical page number bits of the physical address data are the same for each descriptor that has been fetched. The bits forming the physical page number bits will be dependent on the page size associated with the descriptors.

At step 235, attribute match criteria is also checked, the attribute match criteria being met if all attributes apart from the access and dirty bits match. Whilst the access and dirty bits may also match, they are allowed to differ, and the attribute match criteria will be considered met even if they do differ. Assuming the page alignment criteria is met and the attribute match criteria is met, then the test will be considered to be passed at step 240, and accordingly the process will proceed to step 245 where a coalesced entry in the TLB will be created for all of the retrieved descriptors. That coalesced entry will hence provide full address translation data that is common to all of the physical pages identified by the retrieved descriptors, that coalesced address translation data hence effectively relating to a larger sized page than the pages referred to by the individual descriptors.

If the test is determined not to have been passed at step 240, then a non-coalesced entry is created for the identified descriptor only, at step 250. Step 250 hence corresponds to the standard behaviour where the entry provides address translation data for the specific identified descriptor identified as a result of the page table walk process performed at step 215.

Following steps 245 or 250, a table walk response is then generated by the control circuitry 25 using the identified final level descriptor information, and returned to the core to allow the core to generate the physical address.

If during the page table walk process performed at step 215, any invalid descriptors are identified, this will typically cause a page fault. Hence, to reach the point where a final level descriptor is identified at step 215, it is assumed that all of the descriptors encountered during the multi-level page table walk are valid, including that identified final level descriptor. It will be appreciated however that it may not always be the case that the plurality of descriptors subsequently retrieved at step 230 are all valid. In one embodiment, if one or more descriptors is not valid, then it could be decided not to perform any coalescing of the entries. However, in an alternative embodiment it could be decided to continue with the checks at steps 235, and if passed to then create coalesced entries, but to ensure that the valid bits are cleared for any invalid entries rather than those valid bits being set in dependence on the access flags from the corresponding descriptors. As will be discussed later with reference to FIGS. 7A and 7B, during a subsequent lookup process, if the valid bit is clear, a miss will be detected, and the full page table walk process would then be invoked. If by that stage the relevant descriptor had been marked as valid, and the predetermined criteria checked at step 235 are considered to be met, the coalesced entry can then be updated accordingly, and if instead the predetermined criteria are not met, then a separate non-coalesced entry can be made at that point to provide the address translation data for that page.

Figure 6:
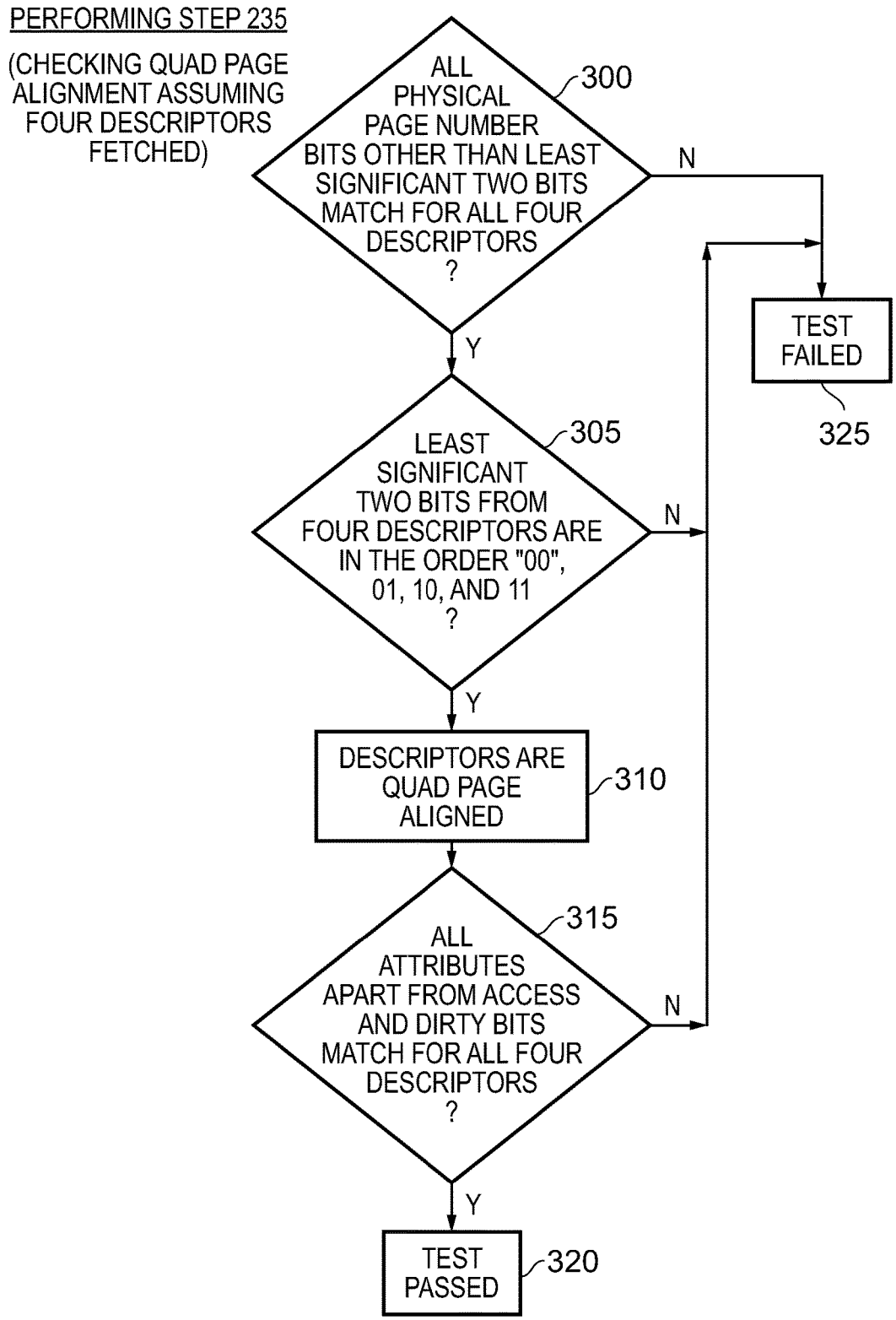
FIG. 6 is a flow diagram illustrating in more detail a sequence of steps that may be implemented to perform step 235 of FIG. 5 in accordance with one embodiment.

FIG. 6 is a flow diagram illustrating in more detail the check performed at step 235 of FIG. 5, for the example where four descriptors are retrieved at step 230, those four descriptors corresponding to virtual addresses whose two least significant bits of the virtual page number bits are 00, 01, 10 and 11, respectively. At step 300, it is determined whether all of the physical page number bits specified by those descriptors, other than the least significant two bits, match for all four descriptors. If not, then the test is determined to be failed at step 325. However, assuming those bits do match, then the process proceeds to step 305, where it is determined whether the least significant two bits within the physical page number bits from the four descriptors all differ and follow a predetermined sequence, which in the illustrated embodiment is assumed to be the case when those bits are in the order 00, 01, 10 and 11. If so, this means that contiguous physical pages have been assigned to contiguous virtual pages, and that hence this is a candidate situation for creating coalesced address translation data, provided the attribute match criteria are met.

In particular, if the "yes" path from step 305 is followed, this means that the descriptors are determined to be quad page aligned at step 310, and accordingly the process proceeds to step 315, where the attribute match criteria is checked. In particular, at step 315 it is determined whether all attributes match for all four descriptors, other than the access and dirty bits, which are allowed to differ. If so, then the test is considered passed at step 320, whereas otherwise the process proceeds to step 325 where the test is considered to be failed. The process also proceeds to step 325 if the no path from step 305 is followed, i.e. the least significant two bits do not have the required sequence.

Figure 7A:
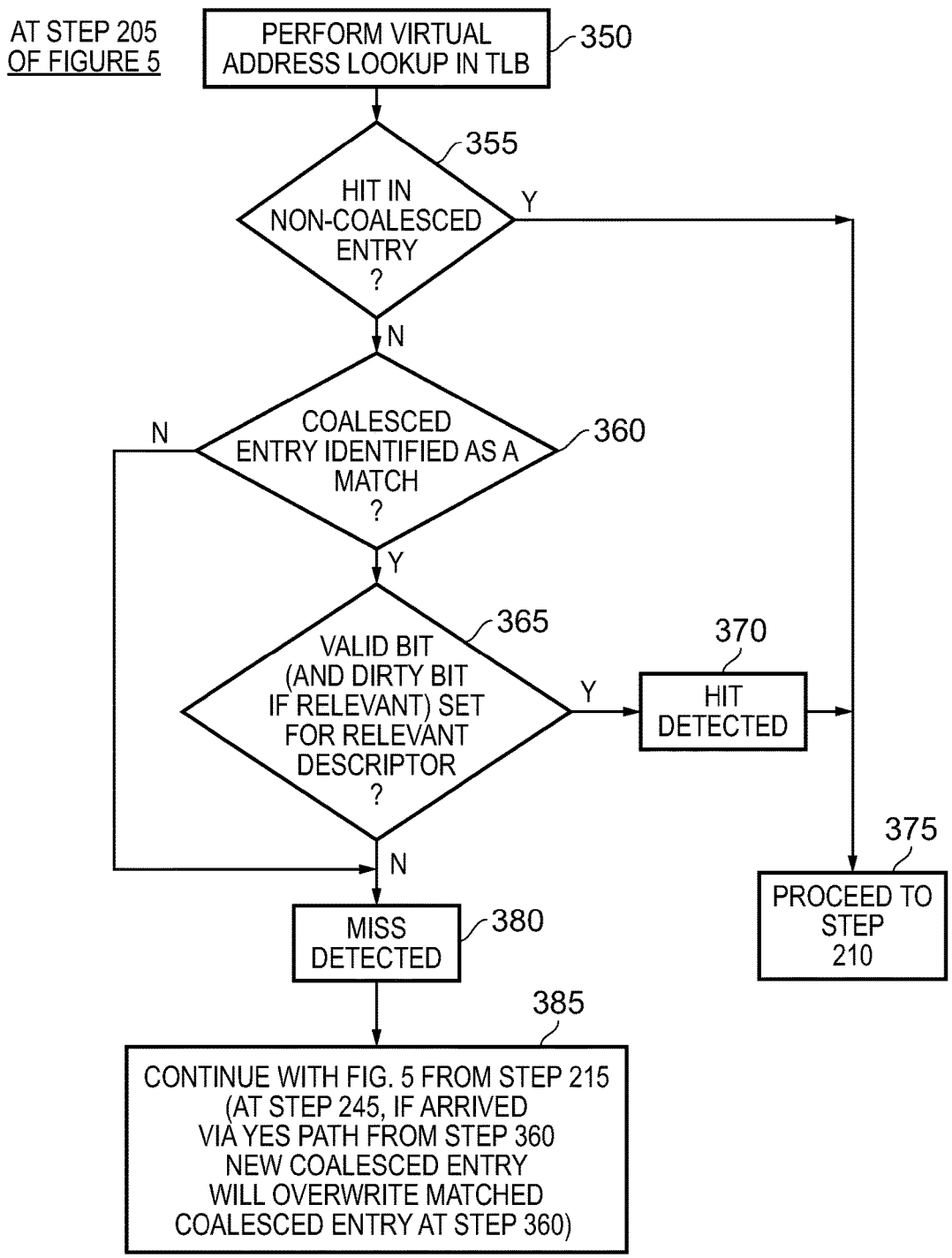
FIG. 7A is a flow diagram illustrating a sequence of steps that may be performed in one embodiment to implement the processing at step 205 of FIG. 5 in accordance with one embodiment.

FIG. 7A is a flow diagram illustrating in more detail the lookup process performed at step 205 in FIG. 5 in order to determine whether a hit condition is detected. In particular, at step 350 a virtual address lookup is performed within the TLB, whereafter at step 355 it is determined whether a hit has been detected in a non-coalesced entry. If it has, then the process proceeds directly to step 210 of FIG. 5, as shown by box 375 in FIG. 7A.

If there is not a hit in a non-coalesced entry, it is determined at step 360 whether a coalesced entry is identified as a match. In particular, at this point it is determined whether the relevant virtual page number bits match the corresponding virtual page number bits provided within the coalesced entry. If not, then the process proceeds to step 380 where a miss is detected. However, if it determined that the coalesced entry is identified as a match, then it is further determined at step 365 whether the valid bit is set for the relevant descriptor. In particular, the log N least significant bits of the virtual page number bits of the received virtual address are used to identify the associated valid bit at step 365 and it is the remaining bits of the virtual page number bits that are used when detecting a match at the preceding step 360.

If the valid bit identified at step 365 is set, then a hit is detected at step 370 assuming the virtual address that caused the lookup to be performed relates to a read access request. If instead it relates to a write access request, then not only the valid bit but also the dirty bit need to be determined to be set at step 365 in order for a hit to be detected at step 370. If a hit is detected, then the process proceeds to step 210 of FIG. 5. However, otherwise a miss is detected at step 380, and as indicated by the box 385, the process then continues with the remainder of the FIG. 5 process starting from step 215.

From the earlier discussion identifying that the valid bits in the coalesced entry are set in dependence on the access bits of the corresponding descriptors, it will be appreciated that when a coalesced entry is generated, if any one of the final level descriptors used has its access bit clear, indicating that the corresponding physical page has not yet been accessed, then the corresponding valid bit within the coalesced entry will be clear, and accordingly a miss will be detected at step 380 when the process of FIG. 7A is later performed in respect of a virtual address that would identify that descriptor. This hence causes the page table walk process to again be performed in order to walk through the various intermediate level descriptors to that final level descriptor. At that point, in accordance with step 220, the access bit (and the dirty bit if applicable) will be set in that final level descriptor. When the four descriptors are again retrieved at step 230, and assuming the checks at step 235 indicate that the predetermined criteria are still met, a coalesced entry will again be created and can be used to overwrite the existing coalesced entry. Accordingly, at step 245 of FIG. 5, if that point has been reached via the "yes" path from step 360 in FIG. 7A (i.e. there was already a coalesced entry but the relevant valid bit was not set), the new coalesced entry will overwrite the entry identified at step 360 as providing a match.

Figure 7B:
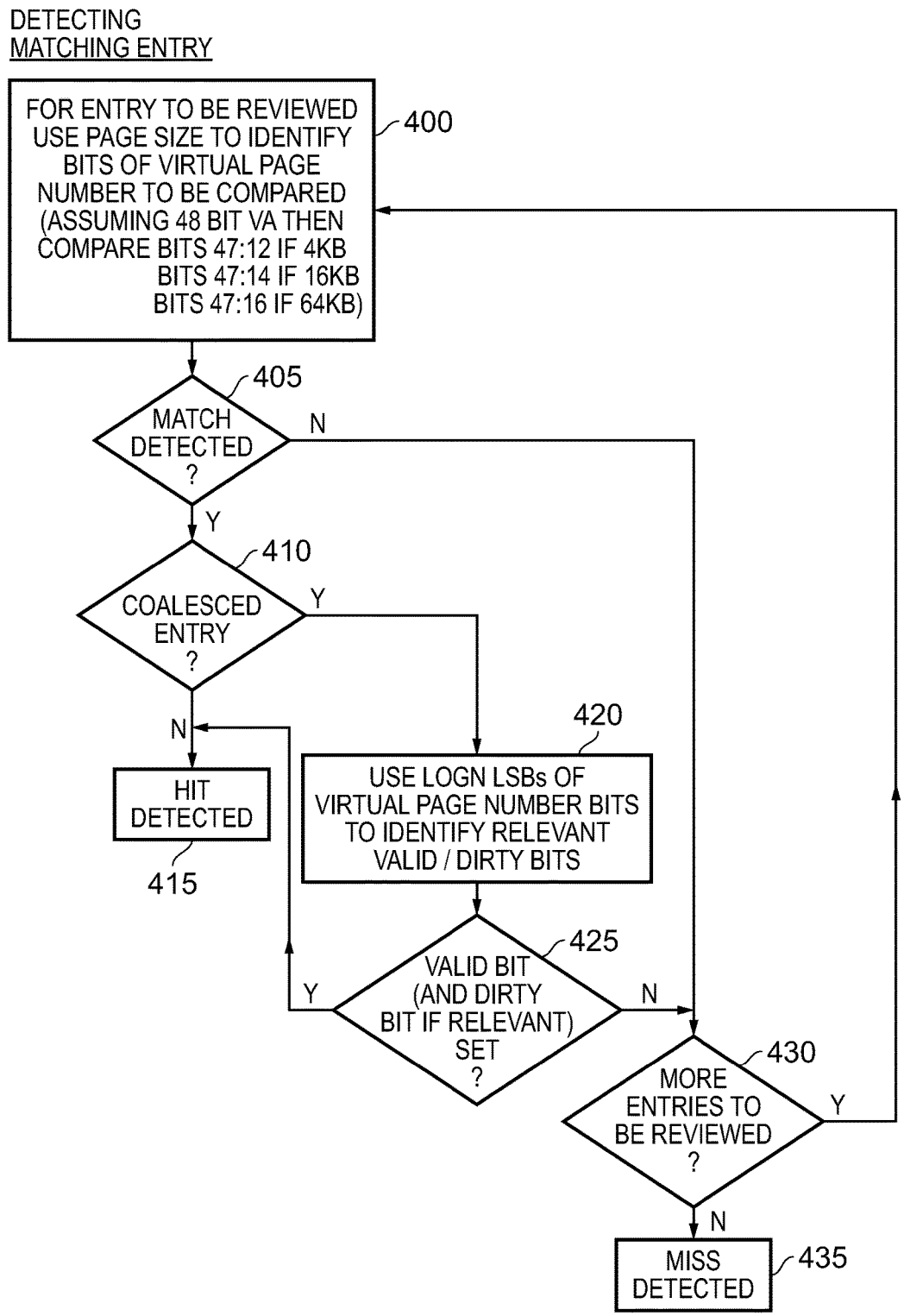
FIG. 7B is a flow diagram illustrating in more detail how a decision is made as to whether a hit has been detected or a miss has been detected when reviewing each entry within the address translation cache in accordance with one embodiment.

FIG. 7B provides more details as to the various bits of the virtual address used during the lookup process in order to detect matches within coalesced entries. In the example of FIG. 7B, it is assumed that the virtual address is a 48-bit virtual address as for example discussed earlier with reference to FIG. 3. As indicated at step 400, when considering a particular entry in the TLB, the page size within the field 186 is used to identify which bits of the virtual page number are compared in order to detect a potential match. In particular, in one example, if the page size is 4 KB, then bits 47 to 12 are used in the comparison. However, when the coalesced entry flag 194 indicates a coalesced entry has been made, then whilst the basic page size information in the field 186 may still identify a 4 KB page size, the coalesced entry effectively relates to a larger page, the size of that page being dependent on the number of descriptors that have been coalesced. For example, if four entries have been coalesced, then the effective page size is 16 KB. As mentioned earlier, the log N least significant bits of the virtual page number bits are used to identify the relevant valid and dirty bits, and it is only the remaining bits that are used in the comparison of the received virtual address with the virtual address bits in the field 182. Hence, as indicated in FIG. 7B, when four descriptors are coalesced, it is bits 47 to 14 that are used in the comparison process, with bits 13 and 12 being used to identify the relevant valid and dirty bits. Similarly, if sixteen entries have been coalesced, the effective page size would be 64 KB, and accordingly bits 47 to 16 would be used when performing a comparison of the received virtual address with the virtual address bits in the field 182, and bits 15 to 12 would be used to identify the relevant valid and dirty bits. In one embodiment, only a single coalesced size is supported, and hence the coalesced entry flag 194 could be a single bit identifying whether the entry is coalesced or not. If multiple different sizes of coalescing were supported, then the coalesced entry flag could be a multi-bit field identifying the number of descriptors that have been coalesced, and hence identifying the effective page size.

Based on the bits chosen for the comparison, it is determined at step 405 whether a match is detected. If not, then at step 430 it is determined whether there are any more entries to be reviewed, and if so the process returns to step 400. However, if all entries have been reviewed and no match has been detected, then a miss is detected at step 435.

If a match is detected at step 405, a hit will be detected at step 415 if the entry is determined to be a standard non-coalesced entry at step 410. However, if it is coalesced entry, then the additional check indicated by steps 420 and 425 is performed. In particular, at step 420 the log N least significant bits of the virtual page number bits are used to identify the relevant valid and dirty bits, and then at step 425 it is determined whether the valid bit (and the dirty bit if relevant) are set. Only if that condition is met is a hit detected at step 415. Otherwise, the process proceeds to step 430.

Figure 8A:
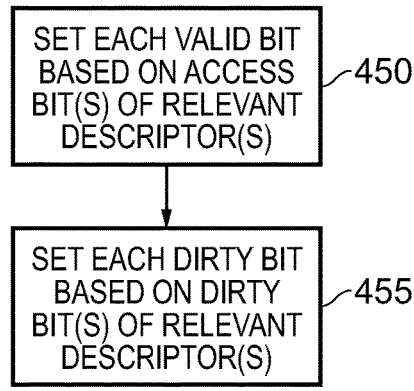
FIG. 8A is a flow diagram illustrating steps performed to set the valid and dirty bits within a coalesced entry within the address translation cache in accordance with one embodiment.

FIG. 8A is a flow diagram identifying how the various valid and dirty bits within a coalesced entry are set. In particular, at step 450, each valid bit is set based on the corresponding access bit of the relevant descriptor, and at step 455 each dirty bit is set based on the dirty bit of the relevant descriptor. If a single stage page table walk process is used, then only one descriptor needs to be considered. However, in a two stage address translation process, as may for example be used where a first stage of translation corresponds to address translation managed by a guest operating system and a second stage translation corresponds to address translation managed by a hypervisor, there will be two descriptors to consider at step 450 and step 455. This is illustrated schematically in FIG. 8B. In particular, using a two stage process, the guest operating system controlled translation will convert a virtual address into an intermediate physical address, whilst at the stage two translation a hypervisor controlled translation will convert the intermediate physical address into a physical address. This process is shown in detail in FIG. 11.

Hence, in such a two-stage translation process, the virtual address 618 is combined with the address in the "guest" base register 620 to generate an intermediate physical address IPA which is translated by the hypervisor to generate the physical address of the first level page descriptor (as illustrating by the four levels of lookup from page table 622 to page table 624). The output from the page table 624 is the physical address of the guest level 0 (S1L0) page table. This page is indexed using bits of the VA and the descriptor returned contains an IPA which is translated again by the hypervisor, which produces a physical address of the guest's level 1 (S1L1) page table. This process continues until the physical address for S1L3 is accessed, which returns the final IPA. This IPA is translated (by the hypervisor) to produce the physical address for the data to be accessed, labelled as the "final PA" in FIG. 11. Thus the multiple-level page table walk illustrated in FIG. 11 may at its full extent involve 24 descriptor fetches until the final physical address is generated, having been subject to translation both by the translations managed by the guest operating system and the translations managed by the hypervisor. This type of two stage multiple-level page table walk is used in a variety of processor architectures, such as x86 and ARM processor architectures, and any radix base page table structure may use the same process.

Figure 8B:
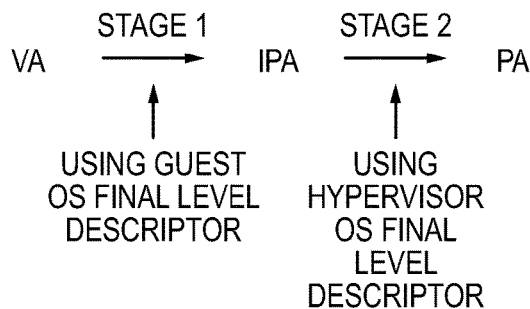
FIG. 8B is a diagram schematically illustrating how the valid and dirty bits are set within a coalesced entry when a two stage address translation process is used in accordance with one embodiment.
Figure 8B:
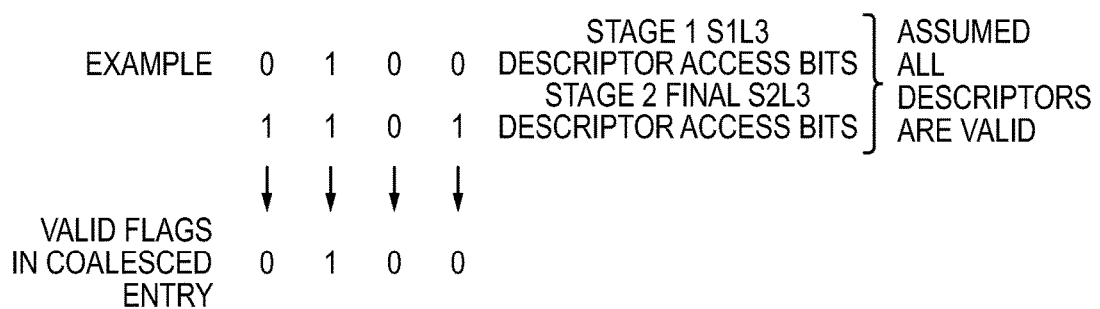

FIG. 8B illustrates how the descriptor access bits from stage 1 and descriptor access bits from stage 2 may be combined to set the valid bits at step 450 of FIG. 8A, when a two stage process is used. Again, this process assumes that all of the descriptors are valid, and accordingly the valid bits will be set based on the access bit information. The stage one descriptors used in FIG. 8B are the S1L3 descriptors 630 shown in FIG. 11. With regard to the stage two descriptors used, these are the final S2L3 descriptors 640 shown in FIG. 11. These various descriptors are subjected to a logical AND operation when setting the valid flags in the coalesced entry, as illustrated schematically in FIG. 8B. Whilst FIG. 8B illustrates how the access bits from the various stage one and stage two descriptors are combined to set the valid bits in the coalesced entry, the same process is also performed for the dirty bits.

In FIG. 8B, it is assumed that the stage one page size is the same as the stage two page size, but this is not a requirement. If the stage one page size is greater than the stage two page size, then a single stage one descriptor may be used, and its access bit value replicated in each of the four lanes shown in FIG. 8B. Again, the same process can also be used for the dirty bit. Similarly, if the stage two page size is greater than the stage one page size, then a single stage two descriptor may be used and its access (and dirty) bits replicated across the multiple lanes.

Figure 11:
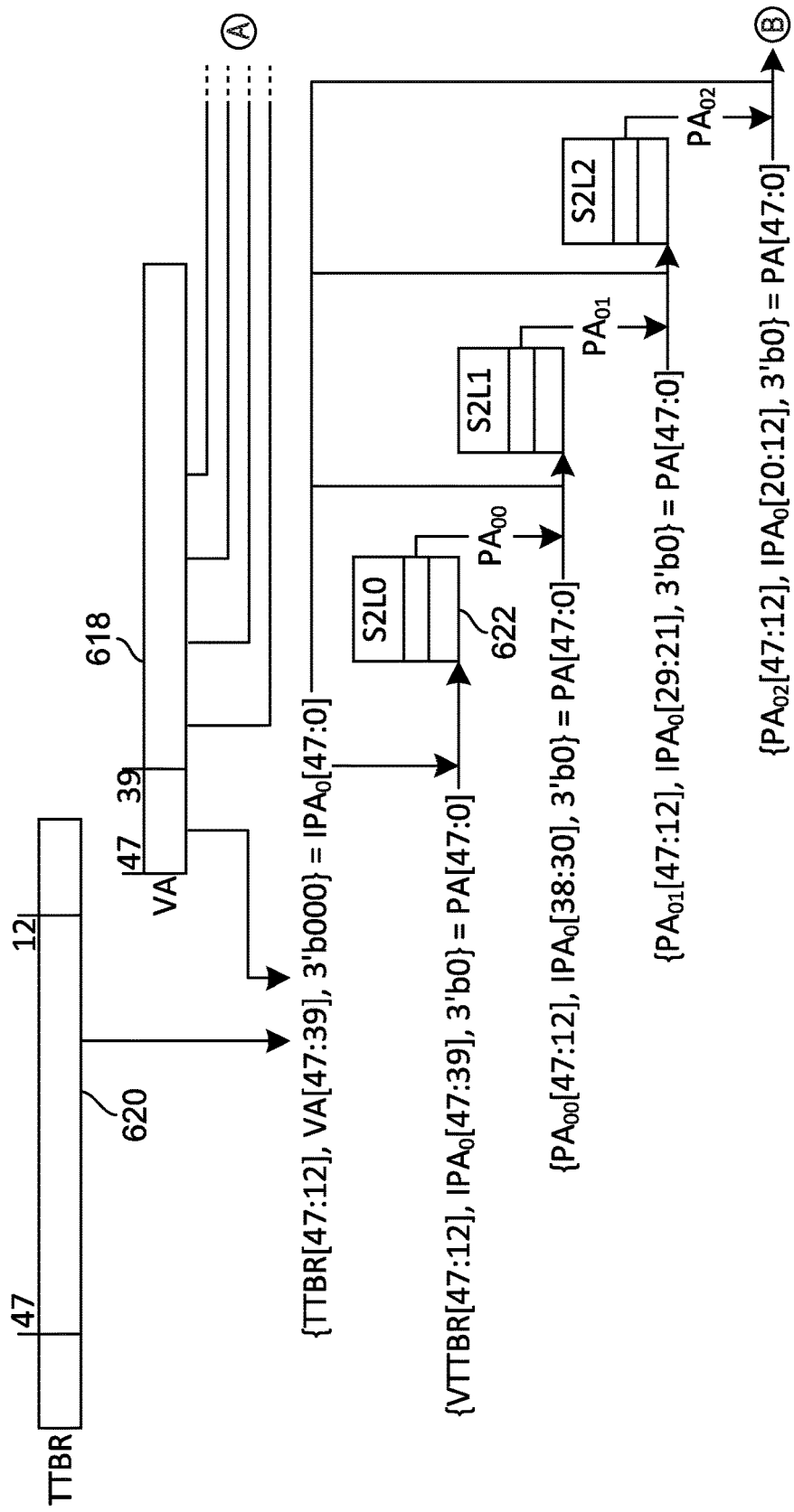
FIG. 11 schematically illustrates a multiple-level page table walk which includes both a first stage of translation corresponding to address translation managed by a guest operating system and a second stage of translation corresponding to address translation managed by a hypervisor.
Figure 11:
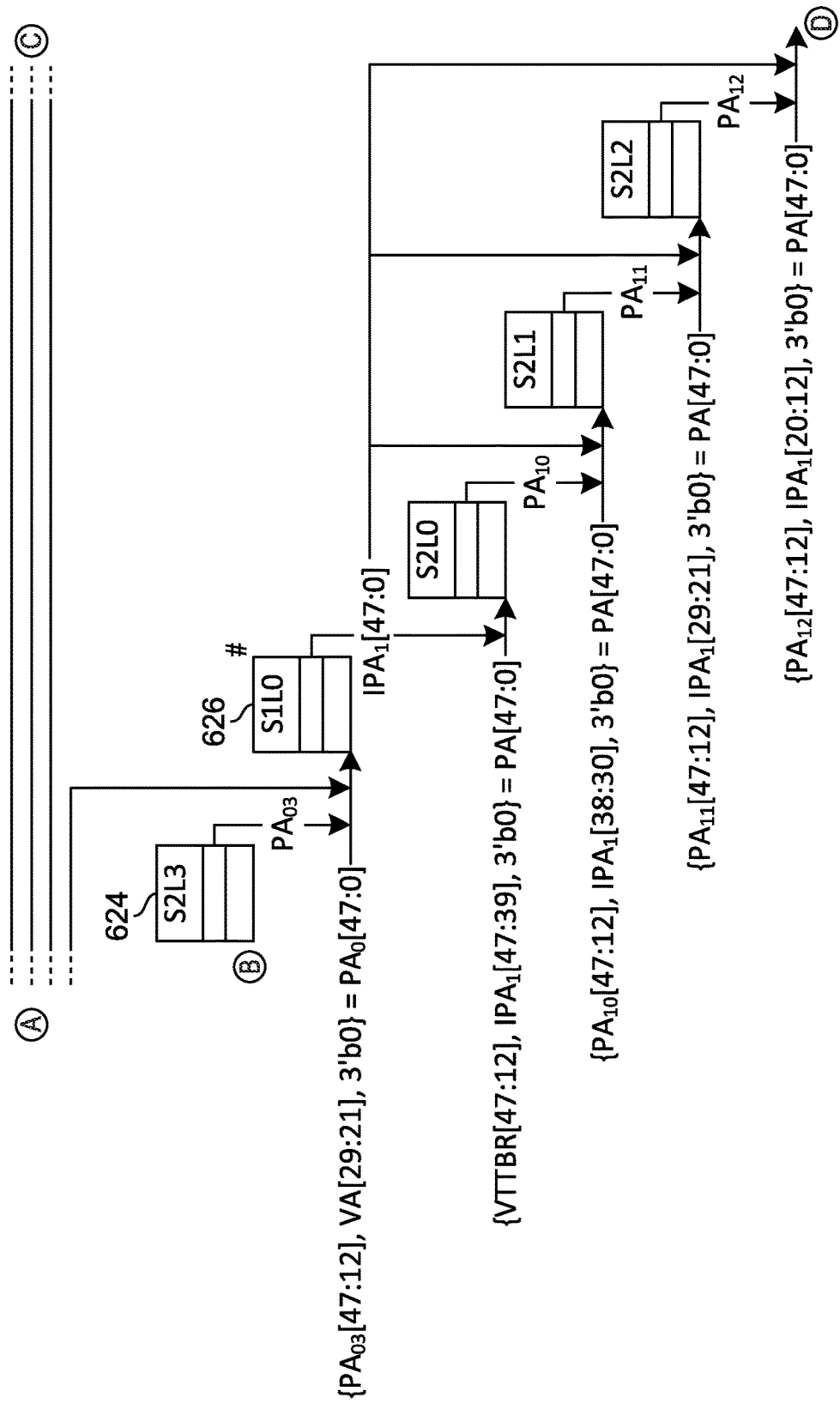
Figure 11:
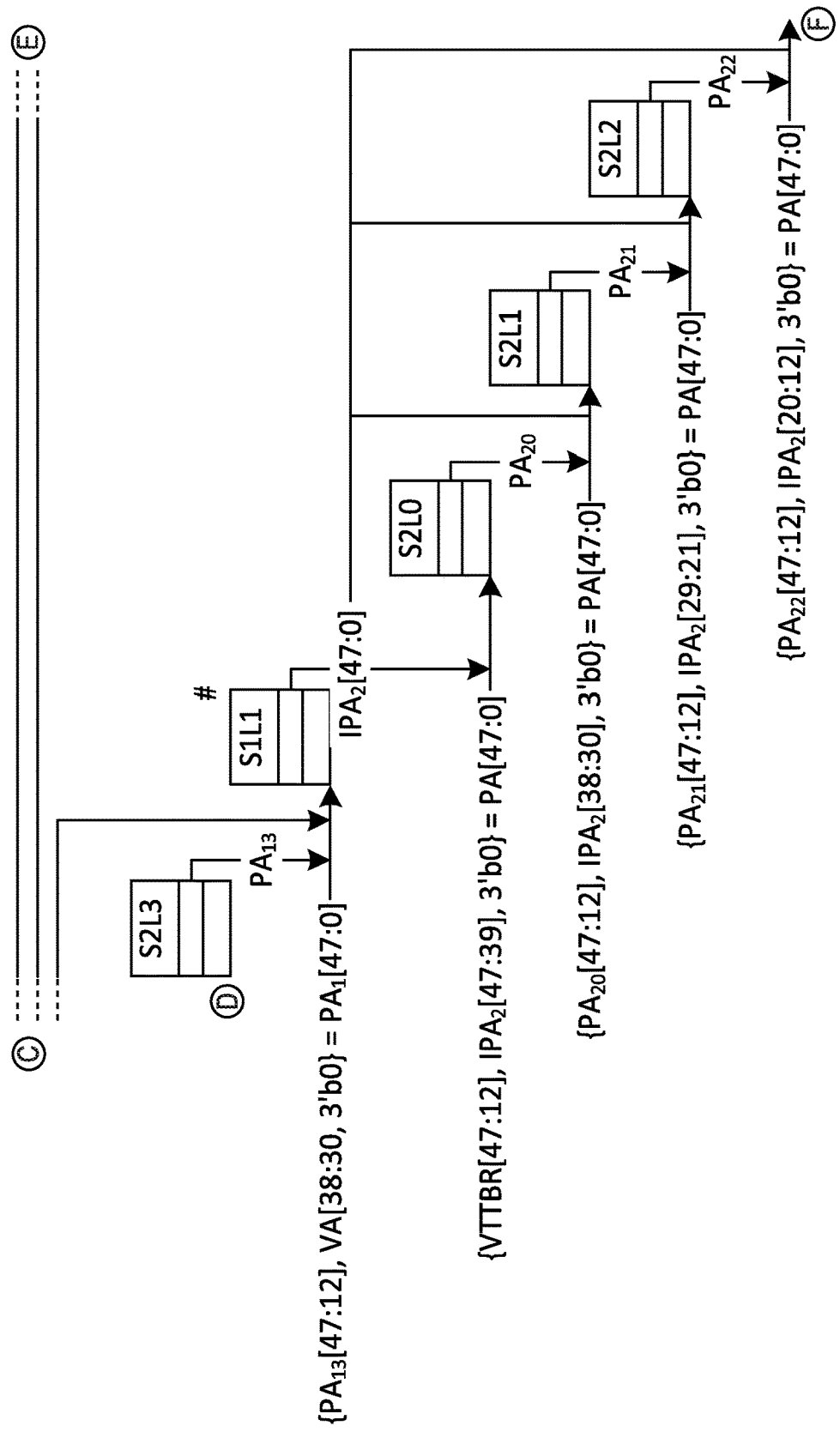
Figure 11:
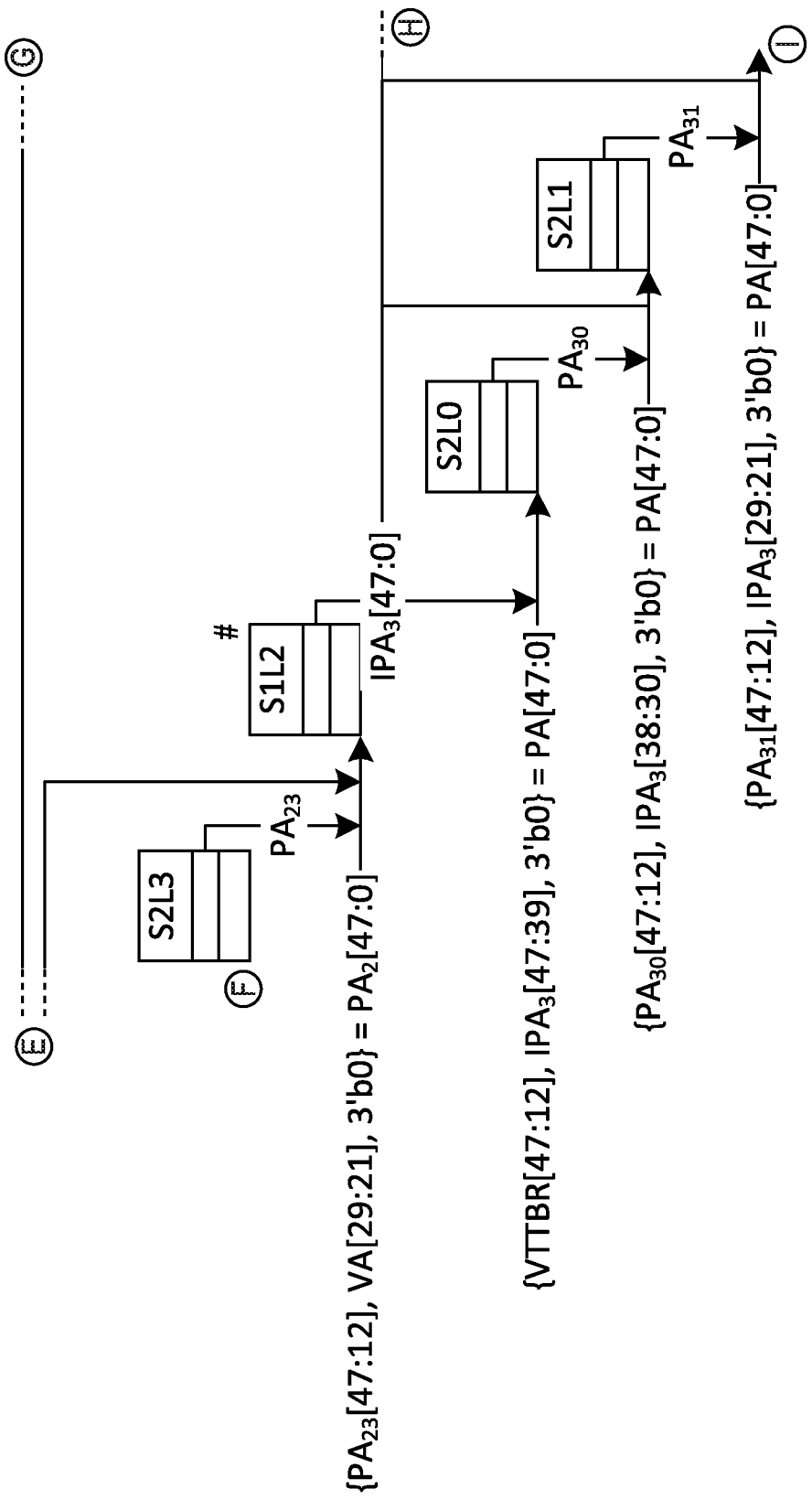
Figure 11:
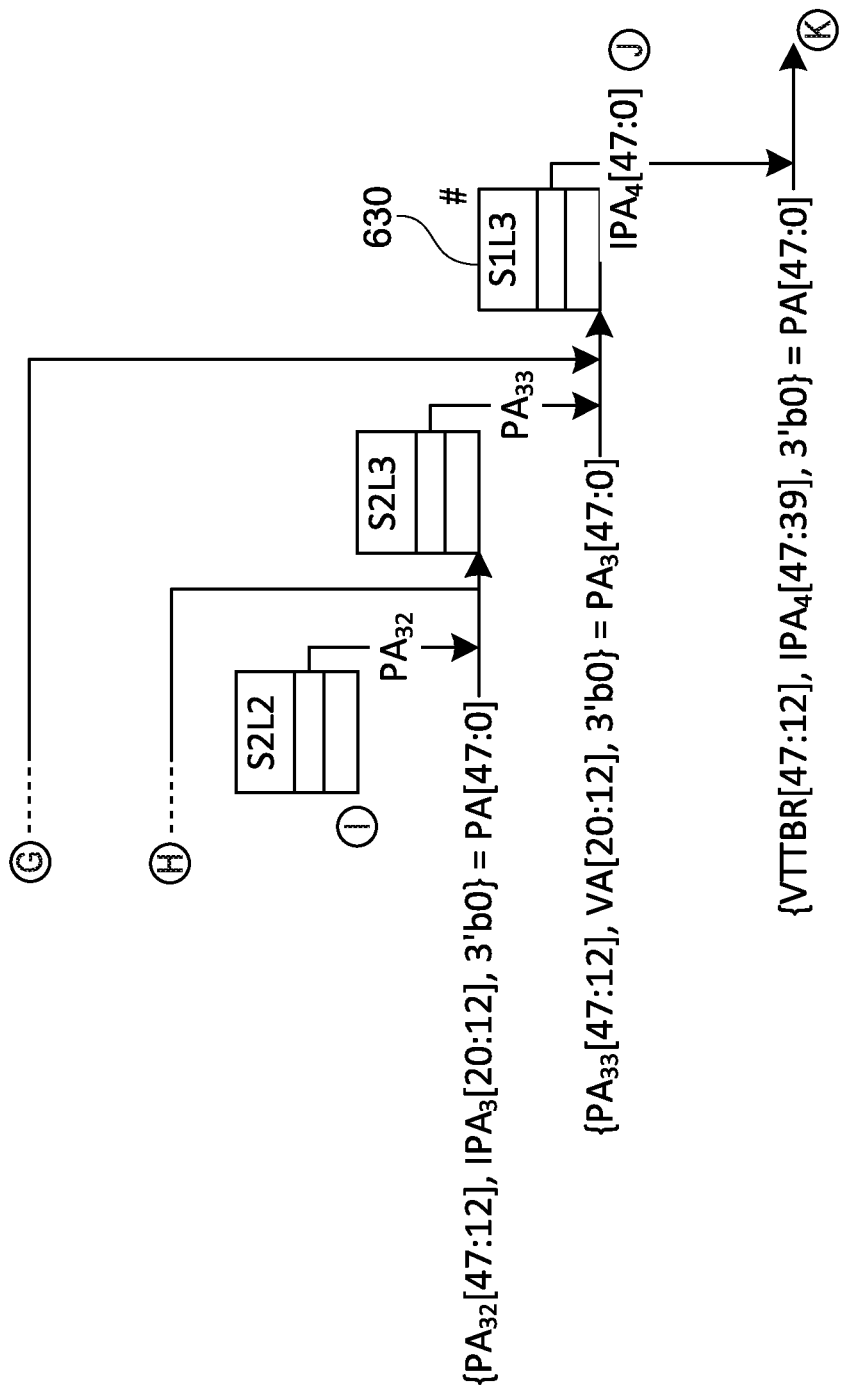
Figure 11:
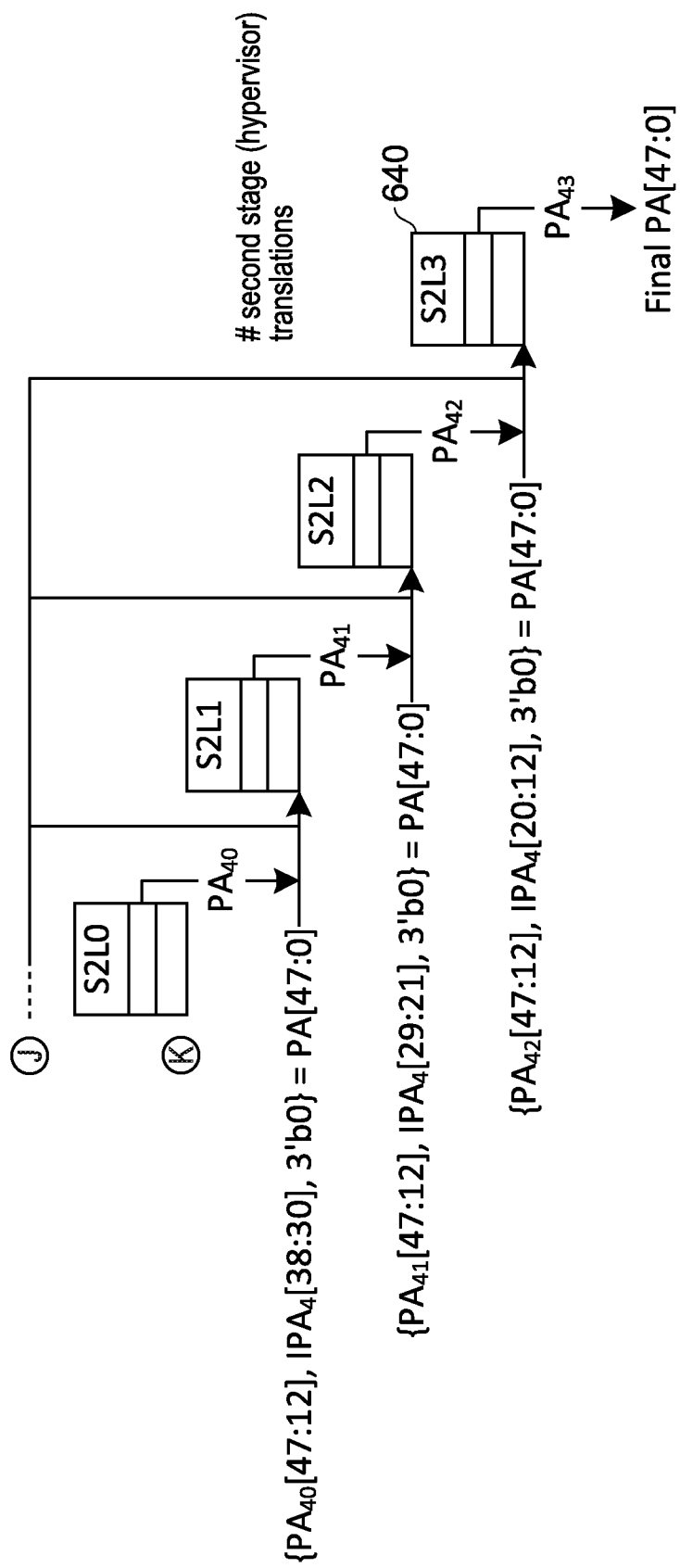

In addition to using the coalescing technique of the described embodiments in relation to address translation data providing a full translation from a virtual address to a physical address (obtained either from a single stage, multi-level, page table walk process as illustrated for example in FIG. 3 or from a multiple-stage, multi-level, page table walk process as illustrated for example in FIG. 11), the coalescing technique can also be used to coalesce information from a plurality of stage 2 descriptors in order to provide coalesced address translation data providing a translation from an intermediate physical address to a physical address, with that coalesced address translation data being stored in a suitable cache structure along with non-coalesced stage 2 translation data.

FIG. 9 illustrates the optional steps that may be performed at step 225 of FIG. 5, if it is decided not to support coalescing in respect of all final level descriptors. In particular, as mentioned earlier, whilst the level three descriptors are final level descriptors, often called page descriptors, preceding level descriptors can also in some instances be final level descriptors. For example, at the level two stage, a block attribute may be set in a descriptor to identify that it should be treated as a final level descriptor, often referred to as a block descriptor. Whilst in one embodiment, both block and page descriptors may be subjected to coalescing, in an alternative embodiment as shown in FIG. 9, it may be decided to only support coalescing in respect of page descriptors (for example in order to limit the number of different page sizes supported by the translation cache). Accordingly, as shown in FIG. 9, step 500 corresponds to step 220 in FIG. 5, and thereafter at step 505 it is determined whether the final level descriptor is a page descriptor. If it is, then the process proceeds to step 230 and continues with the rest of FIG. 5. However, if it is not, i.e. it is a block descriptor, then instead at step 515 only the identified final level descriptor is retrieved, and a non-coalesced entry is created for that identified descriptor in the TLB at step 520. The process then returns to step 255, as shown by the box 525 in FIG. 9.

Figure 10:
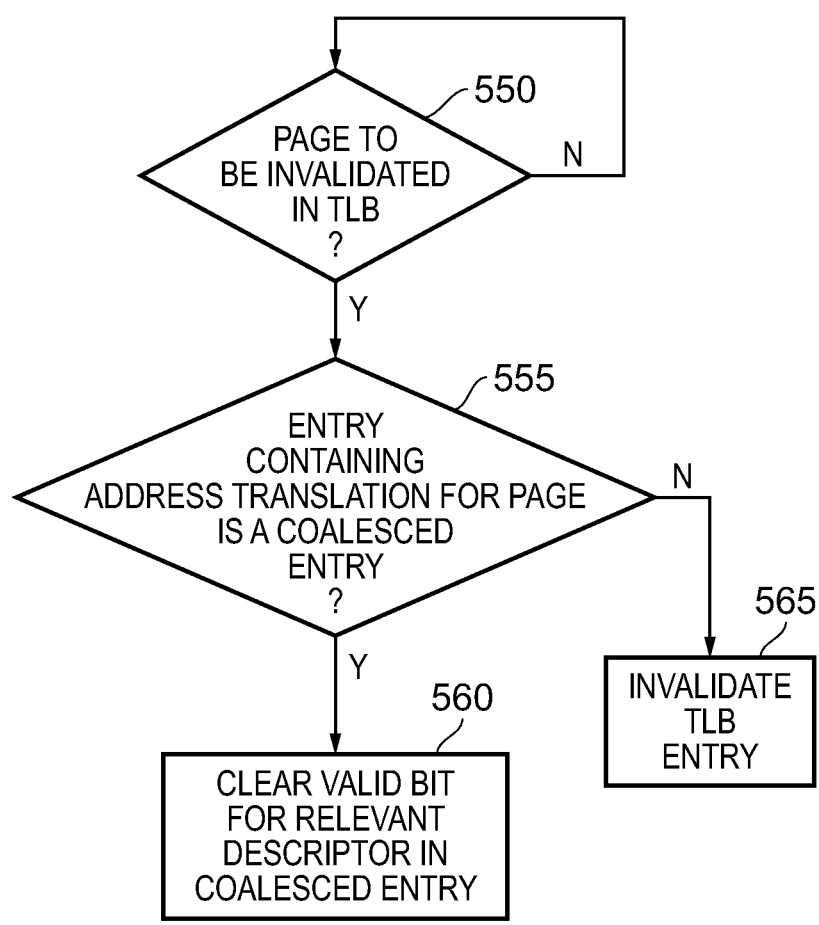
FIG. 10 is a flow diagram illustrating how an invalidation request may be processed in respect of a coalesced entry in accordance with one embodiment.

FIG. 10 illustrates an invalidation technique that can be used in respect of coalesced entries, so as to avoid entire coalesced entries being invalidated in response to an invalidation request. At step 550, it is determined whether a page is to be invalidated in the TLB. This may for example typically be done because the operating system is remapping a page in memory. When it is determined that a page needs to be invalidated in the TLB, it is then determined at step 555 whether the entry that contains the address translation for the page is a coalesced entry. If not, then the TLB entry is merely invalidated in the normal way at step 565. However, if it is a coalesced entry, then instead the process proceeds to step 560, where the valid bit corresponding to the relevant descriptor is cleared in the coalesced entry. However, other valid bits may still be retained in the valid state, to allow the coalesced entry to continue to be used. As will be apparent from the earlier discussion of FIG. 7A, by clearing the valid bit associated with the relevant descriptor, this means that if a virtual address is subsequently issued that maps to that invalidated page, then the presence of the clear valid bit will cause a miss to be detected in the coalesced entry, and the page table walk process to be performed, hence ensuring correct behaviour. In particular, if the page is remapped such that coalescing is no longer possible, then during that subsequent page table walk address translation data for the page will be saved in a non-coalesced entry. The remaining pages can remain coalesced with the remapped page invalid in the coalesced TLB entry.

From the above described embodiments, it will be seen that such embodiments enable situations to be detected where the operating system memory allocation mechanisms have assigned contiguous physical pages to contiguous virtual pages, and in those instances to coalesce multiple virtual-to-physical page translations into a single TLB entry, even in situations where the access and dirty bits of the relevant descriptors differ. This increases the instances where coalescing can be utilised, resulting in increased effective capacity and higher performance of the TLB.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. An apparatus comprising:
an address translation cache having at least one entry, each entry to store address translation data used when converting a virtual address into a corresponding physical address of a memory system;
control circuitry to perform an allocation process to determine the address translation data to be stored in each entry;
the control circuitry arranged when performing the allocation process for a selected entry in the address translation cache:
to perform a page table walk process using a virtual address in order to obtain from a page table a plurality of descriptors including a descriptor identified using the virtual address;
to determine whether predetermined criteria are met by said plurality of descriptors, said predetermined criteria comprising page alignment criteria and attribute match criteria, each descriptor comprising physical address data and attribute data identifying a plurality of attributes, and the attribute match criteria allowing the plurality of descriptors to have different values for a first subset of the attributes when determining that the attribute match criteria is met;
when said predetermined criteria are met, to generate coalesced address translation data from said plurality of adjacent descriptors and to store said coalesced address translation data in said selected entry; and
in absence of said predetermined criteria being met, to generate address translation data from the descriptor identified using the virtual address and to store that address translation data in said selected entry.

2. An apparatus as claimed claim 1, wherein each descriptor in said plurality of descriptors is associated with a physical page in said memory system, and said first subset comprises at least one of an access flag identifying whether the associated physical page has been accessed, and a dirty flag identifying whether the associated physical page contains dirty data.

3. An apparatus as claimed in claim 1, wherein:
each descriptor in said plurality of descriptors is associated with a physical page in said memory system, and comprises an access flag identifying whether the associated physical page has been accessed; and when performing the page table walk process, the control circuitry is arranged to cause the access flag to be set within the descriptor identified using the virtual address.

4. An apparatus as claimed in claim 3, wherein:

each descriptor further comprises a dirty bit identifying whether the associated physical page contains dirty data; and when performing the page table walk process, the control circuitry is arranged to cause the dirty flag to be set within the descriptor identified using the virtual address when the virtual address is associated with a store operation used to update data within the associated physical page.

5. An apparatus as claimed in claim 1, wherein:

the control circuitry is arranged to generate the coalesced address translation data to contain, for each of the descriptors, control data derived from said first subset of the attributes.

6. An apparatus as claimed in claim 5, wherein:

each descriptor in said plurality of descriptors is associated with a physical page in said memory system, and comprises an access flag identifying whether the associated physical page has been accessed; and the control data comprises a valid flag for each descriptor, which is set in dependence dependent on the access flag of the associated descriptor.

7. An apparatus as claimed in claim 6, wherein:

each entry has virtual address data associated therewith;

the control circuitry is arranged to perform a lookup process in response to a received virtual address to determine with reference to the virtual address data of at least a subset of the entries whether a hit condition is detected; and the control circuitry is arranged when analyzing an entry containing said coalesced address translation data during performance of the lookup process to use log N least significant bits of virtual page number bits of the received virtual address to identify associated control data within the entry, where N is the number of descriptors in said plurality of descriptors, and to detect presence of a hit if at least the valid flag within the associated control data is set and the remaining bits of the virtual page number bits match corresponding bits within the virtual address data of the entry.

8. An apparatus as claimed in claim 7, wherein:

the control data further comprises a dirty flag for each descriptor, which is set dependent on the dirty flag of the associated descriptor;

the control circuitry is arranged, when the received virtual address is associated with a store operation used to update data within the associated physical page, to detect presence of a hit if both the valid flag and the dirty flag within the associated control data are set and the remaining bits of the virtual page number bits match corresponding bits within the virtual address data of the entry.

9. An apparatus as claimed in claim 7, wherein each entry includes a page size field to identify the size of the physical page associated with the address translation data, and the control circuitry is arranged to reference the page size information to determine the virtual page number bits of the received virtual address.

10. An apparatus as claimed in claim 7, wherein when the control circuitry performs the lookup process to implement an entry invalidation request, the control circuitry is responsive to detecting the hit condition in relation to an entry containing said coalesced address translation data, to clear the valid flag of the associated control data identified using said log N least significant bits of virtual page number bits of the received virtual address whilst leaving the remaining valid flags within the control data unchanged.

11. An apparatus as claimed in claim 5, wherein:

each descriptor in said plurality of descriptors is associated with a physical page in said memory system, and comprises a dirty flag identifying whether the associated physical page contains dirty data; and the control data comprises a dirty flag for each descriptor, which is set dependent on the dirty flag of the associated descriptor.

12. An apparatus as claimed in claim 5, wherein said page table walk process is a multiple stage page table walk process, and the control data is determined from the first subset of the attributes of the descriptors identified by the multiple stages.

13. An apparatus as claimed in claim 1, wherein said plurality of descriptors comprise N adjacent descriptors, each descriptor in said plurality of descriptors is associated with a physical page in said memory system, and said page alignment criteria requires the physical pages associated with said plurality of descriptors to be N-page aligned.

14. An apparatus as claimed in claim 13, wherein each descriptor comprises physical address data, and the control circuitry is arranged to determine that the page alignment criteria has been met when log N least significant bits of physical page number bits of the physical address data are different for each descriptor in said plurality and follow a predetermined sequence, and the remaining bits of the physical page number bits of the physical address data are the same for each descriptor in said plurality.

15. An apparatus as claimed in claim 1, wherein each entry has an identifier field whose value is controlled by the control circuitry to identify when the address translation data stored therein is said coalesced address translation data.

16. An apparatus as claimed in claim 1, wherein the control circuitry is arranged to make generation of the coalesced address translation data dependent on the plurality of adjacent descriptors being final level descriptors identified during a multi-level page table walk process.

17. An apparatus as claimed in claim 16, wherein the control circuitry is arranged to make generation of the coalesced address translation data dependent on the plurality of adjacent descriptors being page descriptors identified during the multi-level page table walk process.

18. A method of maintaining address translation data within an address translation cache having at least one entry, each entry storing address translation data used when converting a virtual address into a corresponding physical address of a memory system, the method comprising, when performing an allocation process to determine the address translation data to be stored in a selected entry in the address translation cache:

performing a page table walk process using a virtual address in order to obtain from a page table a plurality of descriptors including a descriptor identified using the virtual address;

determining whether predetermined criteria are met by said plurality of descriptors, said predetermined criteria comprising page alignment criteria and attribute match criteria, each descriptor comprising physical address data and attribute data identifying a plurality of attributes, and the attribute match criteria allowing the plurality of descriptors to have different values for a first subset of the attributes when determining that the attribute match criteria is met;

when said predetermined criteria are met, generating coalesced address translation data from said plurality of adjacent descriptors and storing said coalesced address translation data in said selected entry; and in absence of said predetermined criteria being met, generating address translation data from the descriptor identified using the virtual address and storing that address translation data in said selected entry.

19. An apparatus comprising:

means, having at least one entry, for storing address translation data used when converting a virtual address into a corresponding physical address of a memory system;

means for performing an allocation process to determine the address translation data to be stored in each entry;

the means for performing an allocation process, when performing the allocation process for a selected entry in the means for storing:

for performing a page table walk process using a virtual address in order to obtain from a page table a plurality of descriptors including a descriptor identified using the virtual address;

for determining whether predetermined criteria are met by said plurality of descriptors, said predetermined criteria comprising page alignment criteria and attribute match criteria, each descriptor comprising physical address data and attribute data identifying a plurality of attributes, and the attribute match criteria allowing the plurality of descriptors to have different values for a first subset of the attributes when determining that the attribute match criteria is met;

when said predetermined criteria are met, for generating coalesced address translation data from said plurality of adjacent descriptors and for storing said coalesced address translation data in said selected entry; and in absence of said predetermined criteria being met, for generating address translation data from the descriptor identified using the virtual address and for storing that address translation data in said selected entry.

* * * * *